(12) United States Patent
Luan et al.

(10) Patent No.: US 12,287,533 B2
(45) Date of Patent: Apr. 29, 2025

(54) OPTICAL LENS ASSEMBLY AND IMAGING DEVICE

(71) Applicant: NINGBO SUNNY AUTOMOTIVE OPTECH CO., LTD, Ningbo (CN)

(72) Inventors: Xiaoyu Luan, Ningbo (CN); Bo Yao, Ningbo (CN); Dongfang Wang, Ningbo (CN); Qiansen Xie, Ningbo (CN)

(73) Assignee: NINGBO SUNNY AUTOMOTIVE OPTECH CO., LTD, Ningbo (CN)

( * ) Notice: Subject to any disclaimer, the term of this patent is extended or adjusted under 35 U.S.C. 154(b) by 616 days.

(21) Appl. No.: 17/455,946

(22) Filed: Nov. 22, 2021

(65) Prior Publication Data

US 2022/0082793 A1 Mar. 17, 2022

Related U.S. Application Data

(63) Continuation of application No. PCT/CN2020/094046, filed on Jun. 3, 2020.

(30) Foreign Application Priority Data

Jun. 11, 2019 (CN) .......................... 201910499979.4
Jun. 11, 2019 (CN) .......................... 201910500024.6

(51) Int. Cl.
*G02B 9/64* (2006.01)
*G02B 13/00* (2006.01)
(52) U.S. Cl.
CPC ........... *G02B 9/64* (2013.01); *G02B 13/0045* (2013.01); *G02B 13/006* (2013.01)
(58) Field of Classification Search
CPC ..... G02B 13/0045; G02B 13/006; G02B 9/64
See application file for complete search history.

(56) References Cited

U.S. PATENT DOCUMENTS

2012/0056978 A1* 3/2012 Abe ...................... G02B 13/06
359/717
2017/0242220 A1 8/2017 Lee
(Continued)

FOREIGN PATENT DOCUMENTS

| CN | 102388331 A | 3/2012 |
| CN | 103676093 A | 3/2014 |

(Continued)

OTHER PUBLICATIONS

International Search Report issued in International Application No. PCT/CN2020/094046; mailed Aug. 31, 2020; 4 pgs.

*Primary Examiner* — Wyatt A Stoffa
*Assistant Examiner* — Samanvitha Sridhar
(74) *Attorney, Agent, or Firm* — HAUPTMAN HAM, LLP

(57) ABSTRACT

Disclosed are an optical lens, and an imaging device comprising the optical lens. The optical lens comprises: a first lens, a second lens, a third lens, a fourth lens, a fifth lens, a sixth lens and a seventh lens in sequence from an object side to an image side along an optical axis, where the first lens has negative optical power, an object-side surface of the first lens is a convex surface, and an image-side surface of the first lens is a concave surface; the second lens has negative optical power, and an image-side surface of the second lens is a concave surface; the third lens has negative optical power; the fourth lens has positive optical power, and an object-side surface of the fourth lens is a convex surface; the fifth lens has positive optical power, and an object-side surface and an image-side surface of the fifth lens are both convex surfaces; the sixth lens has negative optical power, and an object-side surface and an image-side surface of the sixth lens are both concave surfaces; and the seventh lens (Continued)

has positive optical power, and an object-side surface of the seventh lens is a convex surface.

20 Claims, 7 Drawing Sheets

(56) References Cited

U.S. PATENT DOCUMENTS

| | | | |
|---|---|---|---|
| 2018/0067333 A1 | 3/2018 | Ishibashi | |
| 2018/0203211 A1* | 7/2018 | Kim | G02B 9/64 |
| 2020/0301111 A1* | 9/2020 | Chen | G02B 13/04 |
| 2021/0333510 A1* | 10/2021 | Wei | G02B 9/34 |
| 2023/0258908 A1* | 8/2023 | Yao | G02B 9/64 |
| | | | 359/713 |

FOREIGN PATENT DOCUMENTS

| | | | |
|---|---|---|---|
| CN | 105974561 A | 9/2016 | |
| CN | 107121757 A | 9/2017 | |
| CN | 207074298 U | 3/2018 | |
| CN | 108303788 A | 7/2018 | |
| CN | 108427172 A | 8/2018 | |
| CN | 108761743 A | 11/2018 | |
| CN | 109814229 A | 5/2019 | |
| JP | 2018087932 A | 6/2018 | |
| KR | 20190029277 A | 3/2019 | |

* cited by examiner

OPTICAL LENS ASSEMBLY AND IMAGING DEVICE

CROSS-REFERENCE TO RELATED APPLICATIONS

This application is a continuation of International Application No. PCT/CN2020/094046, filed on Jun. 3, 2020, which claims priorities and benefits from Chinese Patent Application No. 201910500024.6, filed in the National Intellectual Property Administration (CNIPA) on Jun. 11, 2019, and Chinese Patent Application No. 201910499979.4, filed in the CNIPA on Jun. 11, 2019. The aforementioned patent applications are hereby incorporated by reference in their entireties.

TECHNICAL FIELD

The present disclosure relates to an optical lens assembly and an imaging device including the optical lens assembly, in particular, to an optical lens assembly including seven lenses and an imaging device.

BACKGROUND

In recent years, with the promotion of the concept of unmanned driving and the continuous maturity of unmanned driving technology, unmanned driving may become a trend of future automobile development. A key technical problem of unmanned driving is how to acquire sufficiently accurate road information. Therefore, unmanned driving has unique requirements for various parts of the automobile, especially for information collection parts. Wide-angle lens assemblies are suitable for use in automobiles due to its large field-of-view. Therefore, the industry expects a wide-angle lens assembly having high imaging quality.

Compared with an ordinary optical lens assembly, an on-board lens assembly in an automatic driving assistance system has special requirements. For example, an on-board camera lens assembly requires a front port diameter to be as small as possible, having strong light-through capability, can adapt to light and dark changes of an external environment, and at the same time requires high imaging clarity.

In order to achieve megapixel resolution, a wide-angle lens assembly usually uses aspheric surfaces to correct aberrations including a chromatic aberration. By increasing the number of lenses to more than 7 to obtain a high resolution, but this will increase the volume and weight of the lens assembly, which is not conducive to miniaturization of the lens assembly, and at the same time may cause the cost to rise.

At present, in most cases, plastic lenses are used to achieve the effects of reducing the cost and handiness. However, high degree of plasticization is difficult to overcome because of the thermal expansion and contraction characteristics of the plastic lenses. Although a temperature performance is well achieved through the matching of lens refractive power and selection of materials, the overall temperature performance still cannot meet the increasingly stringent temperature requirement. Of course, the imaging quality may also be improved by using glass aspheric lenses to meet the temperature performance requirement, but the manufacturing process of glass aspheric surfaces is difficult and the cost is high.

SUMMARY

Embodiments of the present disclosure provides an optical lens assembly and an imaging device including the optical lens assembly.

According to an aspect, some embodiments of the present disclosure provide an optical lens assembly, the optical lens assembly, from an object side to an image side along an optical axis may sequentially include: a first lens, a second lens, a third lens, a fourth lens, a fifth lens, a sixth lens and a seventh lens. The first lens may have negative optical power, an object-side surface of the first lens is a convex surface, and an image-side surface of the first lens is a concave surface; the second lens may have negative optical power, and an image-side surface of the second lens is a concave surface; the third lens may have negative optical power; the fourth lens may have positive optical power, and an object-side surface of the fourth lens is a convex surface; the fifth lens may have positive optical power, and an object-side surface and an image-side surface of the fifth lens are both convex surfaces; the sixth lens may have negative optical power, and an object-side surface and an image-side surface of the sixth lens are both concave surfaces; and the seventh lens may have positive optical power, and an object-side surface of the seventh lens is a convex surface.

In some embodiments, an object-side surface of the second lens may be a convex surface. Alternatively, an object-side surface of the second lens may be a concave surface.

In some embodiments, an object-side surface of the third lens may be a convex surface, and an image-side surface of the third lens may be a concave surface. Alternatively, an object-side surface of the third lens may be a concave surface, and an image-side surface of the third lens may be a convex surface. Alternatively, an object-side surface and an image-side surface of the third lens may both be concave surfaces.

In some embodiments, an image-side surface of the fourth lens may be a convex surface. Alternatively, an image-side surface of the fourth lens may be a concave surface.

In some embodiments, an image-side surface of the seventh lens may be a convex surface. Alternatively, an image-side surface of the seventh lens may be a concave surface.

In some embodiments, the fifth lens and the sixth lens may be cemented to form a cemented lens.

In some embodiments, the optical lens assembly may include at least 3 aspheric lenses.

In some embodiments, the second lens, the fourth lens and the seventh lens may all be aspheric lenses.

In some embodiments, an axial distance d12 from a center of the image-side surface of the first lens to a center of the object-side surface of the second lens and a total track length TTL of the optical lens assembly may satisfy: $d12/TTL \leq 0.25$.

In some embodiments, a maximum field-of-view FOV of the optical lens assembly, a total focal length value F of the optical lens assembly, and an image height H corresponding to the maximum field-of-view of the optical lens assembly may satisfy: $(FOV \times F)/H \geq 45$.

In some embodiments, an axial distance d34 from a center of the image-side surface of the third lens to a center of the object-side surface of the fourth lens and an axial distance d45 from a center of the image-side surface of the fourth lens to a center of the object-side surface of the fifth lens may satisfy: $d34/d45 \leq 1.6$.

In some embodiments, a maximum field-of-view FOV of the optical lens assembly, a maximum aperture diameter D of the object-side surface of the first lens corresponding to the maximum field-of-view of the optical lens assembly, and an image height H corresponding to the maximum field-of-view of the optical lens assembly may satisfy: D/H/FOV≤0.025.

In some embodiments, a total track length TTL of the optical lens assembly, a maximum field-of-view FOV of the optical lens assembly, and an image height H corresponding to the maximum field-of-view of the optical lens assembly may satisfy: TTL/H/FOV≤0.035.

In some embodiments, an opening angle of the image-side surface of the first lens under a maximum field-of-view of the optical lens assembly may satisfy: arctan(SAG2/d2)≥45, where, d2 is a half-diameter of a maximum aperture diameter of the image-side surface of the first lens corresponding to a maximum field-of-view of the optical lens assembly, and SAG2 is a sagittal height SG value of the image-side surface of the first lens corresponding to the maximum field-of-view of the optical lens assembly.

In some embodiments, a focal length value F4 of the fourth lens and a focal length value F5 of the fifth lens may satisfy: 0.5≤|F4/F5|≤3.

In some embodiments, a focal length value F7 of the seventh lens and a total focal length value F of the optical lens assembly may satisfy: F7/F≤5.

In some embodiments, a lens group length TL of the optical lens assembly and a total focal length value F of the optical lens assembly may satisfy: TL/F≤15.

In some embodiments, a focal length value F2 of the second lens and a total focal length value F of the optical lens assembly may satisfy: 2≤|F2/F|≤6.

Embodiments of the present disclosure employ, for example, seven lenses. By optimizing the shapes of the lenses, rationally distributing the refractive power of each lens and forming a cemented lens, etc., the optical lens assembly has at least one beneficial effect, such as a high resolution, miniaturization, a small front-end diameter, a good temperature performance, a huge field-of-view (FOV can reach more than 180), telephoto and the like.

In one aspect, some embodiments of the present disclosure provide an optical lens assembly, the optical lens assembly, from an object side to an image side along an optical axis may sequentially include: a first lens, a second lens, a third lens, a fourth lens, a fifth lens, a sixth lens and a seventh lens, where: the first lens has negative optical power, an object-side surface of the first lens is a convex surface, and an image-side surface of the first lens is a concave surface; the second lens has negative optical power, and an image-side surface of the second lens is a concave surface; the third lens has negative optical power; the fourth lens has positive optical power, an object-side surface of the fourth lens is a convex surface, and an image-side surface of the fourth lens is a convex surface; the fifth lens has positive optical power, an object-side surface of the fifth lens is a convex surface, and an image-side surface of the fifth lens is a convex surface; the sixth lens has negative optical power, an object-side surface of the sixth lens is a concave surface, and an image-side surface of the sixth lens is a concave surface; and the seventh lens has positive optical power, an object-side surface of the seventh lens is a convex surface, and an image-side surface of the seventh lens is a convex surface.

In some embodiments, the fifth lens, the sixth lens, and the seventh lens may be cemented in sequence.

In some embodiments, an object-side surface of the second lens may be a convex surface.

In some embodiments, an object-side surface of the second lens may be a concave surface.

In some embodiments, an object-side surface of the third lens may be a concave surface, and an image-side surface of the third lens may be a convex surface.

In some embodiments, an object-side surface of the third lens may be a concave surface, and an image-side surface of the third lens may be a concave surface.

In some embodiments, an object-side surface of the third lens may be a convex surface, and an image-side surface of the third lens may be a concave surface.

In some embodiments, at least three of the first lens to the seventh lens may be aspheric lenses.

In some embodiments, the second lens, the third lens, and the fourth lens may be aspheric lenses.

In some embodiments, a distance TL from a center of the object-side surface of the first lens to a center of the image-side surface of the seventh lens and a total effective focal length F of the optical lens assembly may satisfy: TL/F≤15.

In some embodiments, a distance TTL from a center of the object-side surface of the first lens to an imaging plane of the optical lens assembly, an image height H corresponding to a maximum field-of-view of the optical lens assembly, and the maximum field-of-view FOV of the optical lens assembly may satisfy: TTL/H/FOV≤0.035.

In some embodiments, a maximum aperture diameter D of the object-side surface of the first lens corresponding to the maximum field-of-view of the optical lens assembly, the image height H corresponding to the maximum field-of-view of the optical lens assembly, and the maximum field-of-view FOV of the optical lens assembly may satisfy: D/H/FOV≤0.025.

In some embodiments, the maximum field-of-view FOV of the optical lens assembly, the total effective focal length F of the optical lens assembly, and the image height H corresponding to the maximum field-of-view of the optical lens assembly may satisfy: (FOV×F)/H≥45.

In some embodiments, a distance d12 from a center of the image-side surface of the first lens to a center of the object-side surface of the second lens and the distance TTL from the center of the object-side surface of the first lens to the imaging plane of the optical lens assembly may satisfy: d12/TTL≤0.3.

In some embodiments, an effective focal length F4 of the fourth lens and an effective focal length F5 of the fifth lens may satisfy: F4/F5≤3.

In some embodiments, an effective focal length F3 of the third lens and a radius of curvature R5 of the object-side surface of the third lens may satisfy: |F3/R5|≤5.

In some embodiments, an effective focal length F2 of the second lens and the total effective focal length F of the optical lens assembly may satisfy: 1.5≤|F2/F|≤4.5.

In some embodiments, a combined focal length F567 of the fifth lens, the sixth lens, and the seventh lens and the total effective focal length F of the optical lens assembly may satisfy: 2≤F567/F≤7.

In some embodiments, an opening angle of the image-side surface of the first lens under the maximum field-of-view may be above 45°.

In some embodiments, a temperature coefficient of refractive index dn/dt(5) of the fifth lens and a temperature coefficient of refractive index dn/dt(6) of the sixth lens may satisfy: $-3\times10^{-5}\leq dn/dt(5)+dn/dt(6)\leq -2\times10^{-5}$.

In yet another aspect, some embodiments of the present disclosure provide an imaging device, and the imaging device may include the optical lens assembly according to the above embodiments and an imaging element for converting an optical image formed by the optical lens assembly into an electrical signal.

Embodiments of the present disclosure employ, for example, seven lenses. The optical lens assembly has at least one beneficial effect, such as a small aperture, a high resolution, miniaturization, low cost, small Chief Ray Angle (CRA), a good temperature performance, a huge field-of-view and telephoto and the like, by optimizing the shape and the refractive power of each lens and the like.

BRIEF DESCRIPTION OF THE DRAWINGS

Other features, objectives, and advantages of the present disclosure will become more apparent from the following detailed description of the non-limiting embodiments with reference to the accompanying drawings. In the drawings.

DETAILED DESCRIPTION OF EMBODIMENTS

Figure 1:
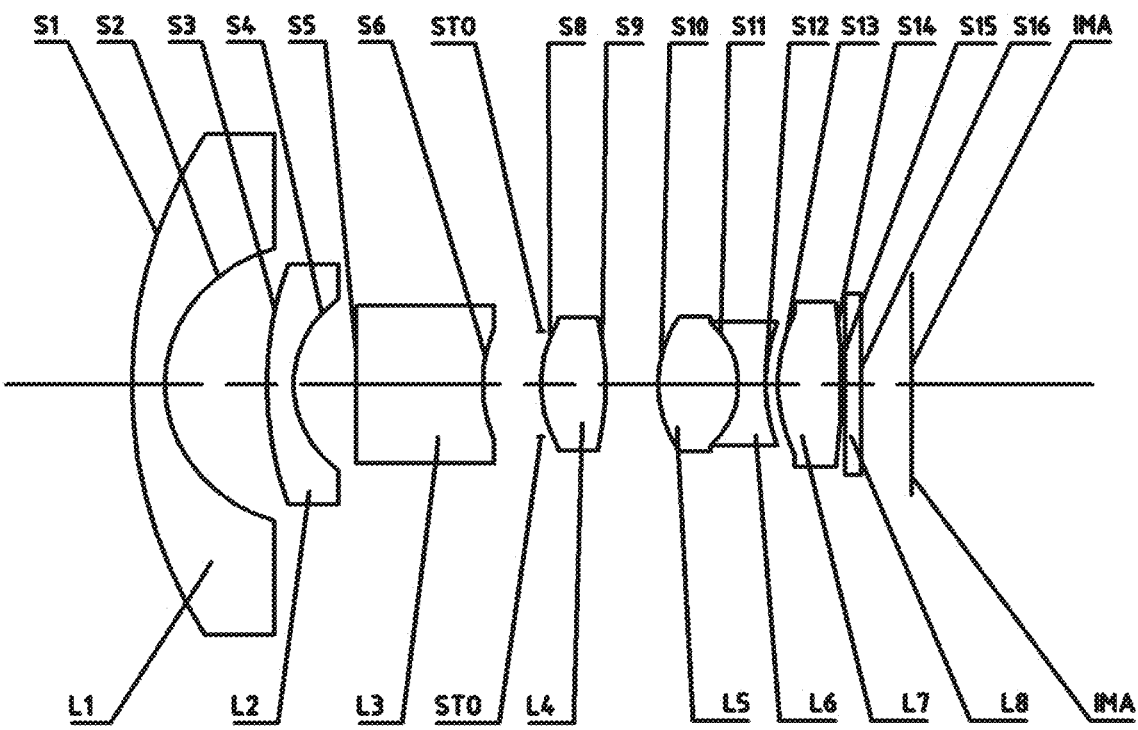
FIG. 1 illustrates a schematic structural diagram of an optical lens assembly according to Embodiment 1 of the present disclosure.

For a better understanding of embodiments of the present disclosure, various aspects of the present disclosure will be described in more detail with reference to the accompanying drawings. It should be understood that the detailed description is merely illustrative of exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial region refers to a region near the optical axis. If a surface of a lens is convex and the position of the convex is not defined, it indicates that the surface of the lens is convex at least in the paraxial region; and if a surface of a lens is concave and the position of the concave is not defined, it indicates that the surface of the lens is concave at least in the paraxial region. In each lens, the surface closest to the object is referred to as an object-side surface of the lens, and the surface closest to the image side is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, embodiments in the present disclosure and the features in the embodiments may be combined with each other on a non-conflict basis. Embodiments of the present disclosure will be described in detail below with reference to the accompanying drawings. The features, principles, and other aspects of the present disclosure are described in detail below.

An optical lens assembly according to exemplary embodiments of the present disclosure includes, for example, seven lenses having refractive power, i.e., a first lens, a second lens, a third lens, a fourth lens, a fifth lens, a sixth lens and a seventh lens. The seven lenses are arranged sequentially from an object side to an image side along an optical axis.

The optical lens assembly according to exemplary embodiments of the present disclosure may further include a photosensitive element disposed on an imaging plane. Alternatively, the photosensitive element disposed on the imaging plane may be a Charge-Coupled Device element (CCD) or a Complementary Metal-Oxide Semiconductor element (CMOS).

On the one hand, the first lens may have negative refractive power, an object-side surface of the first lens may be a convex surface, and an image-side surface of the first lens may be a concave surface. The first lens is set as a meniscus shape with the convex surface towards the object side, which is conducive to collecting light from a large field-of-view as much as possible and allowing the light to enter the rear optical system. In practical applications, considering the outdoor installation and use environment of on-board lens assemblies, and the lens assemblies will be used in severe weather conditions such as rain and snow, setting the first lens as the meniscus shape with the convex surface towards the object side is conducive to the dripping of water droplets, thereby reducing the influence on imaging quality of the lens assemblies. The first lens may use a high refractive index material. For example, a refractive index Nd1 of the material of the first lens may satisfy: $Nd1 \geq 1.65$, so as to help reduce a front port diameter and improve the imaging quality.

The second lens may have negative refractive power, an object-side surface of the second lens may, alternatively, be a convex surface or a concave surface, and an image-side surface of the second lens may be a concave surface. The second lens appropriately compresses the light collected by the first lens to make the light trend transition smoothly. In addition, the image-side surface of the second lens is set as a concave surface, which may help reduce a distance between the first lens and the second lens, which is easier to shorten a total physical length of the lens assembly and achieve miniaturization.

The third lens may have negative refractive power, an object-side surface of the third lens may be a convex surface, and an image-side surface of the third lens may be a concave surface; alternatively, the third lens may have negative refractive power, an object-side surface of the third lens may be a concave surface, and an image-side surface of the third lens may be a convex surface; alternatively, the third lens may have negative refractive power, an object-side surface of the third lens may be a concave surface, and an image-side surface of the third lens may be a concave surface. The third lens is set as having a negative focal length, which may balance a spherical aberration and positional chromatic aberration introduced by the preceding two lenses, and at the same time may help reduce the overall length of the optical system.

The fourth lens may have positive refractive power, an object-side surface of the fourth lens may be a convex surface, and an image-side surface of the fourth lens may, alternatively, be a convex surface or a concave surface. The fourth lens may converge light, make divergent light enter the rear smoothly, compress the light, and make the light trend transition smoothly.

The fifth lens may have positive refractive power, and an object-side surface and an image-side surface of the fifth lens may both be convex surfaces.

The sixth lens may have negative refractive power, and an object-side surface and an image-side surface of the sixth lens may both be concave surfaces.

The seventh lens may have positive refractive power, an object-side surface of the seventh lens may be a convex surface, and an image-side surface of the seventh lens may, alternatively, be a convex surface or a concave surface. The seventh lens is a converging lens, so that the light may converge effectively and smoothly at the end, so that the light may reach the imaging plane smoothly, and reduce an overall weight and cost.

Those skilled in the art should understand that each lens of the optical lens assembly according to exemplary embodiments of the present disclosure may have different surface shape configuration combinations.

For example, in some exemplary embodiments, an object-side surface of the first lens may be a convex surface, and an image-side surface of the first lens may be a concave surface. An object-side surface of the second lens may be a convex surface, and an image-side surface of the second lens may be a concave surface. An object-side surface of the third lens may be a convex surface, and an image-side surface of the third lens may be a concave surface. An object-side surface and an image-side surface of the fourth lens may both be convex surfaces. An object-side surface and an image-side surface of the fifth lens may both be convex surfaces. An object-side surface and an image-side surface of the sixth lens may both be concave surfaces. An object-side surface and an image-side surface of the seventh lens may both be convex surfaces.

In some exemplary embodiments, an object-side surface of the first lens may be a convex surface, and an image-side surface of the first lens may be a concave surface. An object-side surface and an image-side surface of the second lens may both be concave surfaces. An object-side surface of the third lens may be a convex surface, and an image-side surface of the third lens may be a concave surface. An object-side surface and an image-side surface of the fourth lens may both be convex surfaces. An object-side surface and an image-side surface of the fifth lens may both be convex surfaces. An object-side surface and an image-side surface of the sixth lens may both be concave surfaces. An object-side surface and an image-side surface of the seventh lens may both be convex surfaces.

In some exemplary embodiments, an object-side surface of the first lens may be a convex surface, and an image-side surface of the first lens may be a concave surface. An object-side surface and an image-side surface of the second lens may both be concave surfaces. An object-side surface of the third lens may be a concave surface, and an image-side surface of the third lens may be a convex surface. An object-side surface of the fourth lens may be a convex surface, and an image-side surface of the fourth lens may be a concave surface. An object-side surface and an image-side surface of the fifth lens may both be convex surfaces. An object-side surface and an image-side surface of the sixth lens may both be concave surfaces. An object-side surface of the seventh lens may be a convex surface, and an image-side surface of the seventh lens may be a concave surface.

In some exemplary embodiments, an object-side surface of the first lens may be a convex surface, and an image-side surface of the first lens may be a concave surface. An object-side surface and an image-side surface of the second lens may both be concave surfaces. An object-side surface and an image-side surface of the third lens may both be concave surfaces. An object-side surface and an image-side surface of the fourth lens may both be convex surfaces. An object-side surface and an image-side surface of the fifth lens may both be convex surfaces. An object-side surface and an image-side surface of the sixth lens may both be concave surfaces. An object-side surface and an image-side surface of the seventh lens may both be convex surfaces.

In some exemplary embodiments, an object-side surface of the first lens may be a convex surface, and an image-side surface of the first lens may be a concave surface. An object-side surface of the second lens may be a convex surface, and an image-side surface of the second lens may be a concave surface. An object-side surface and an image-side surface of the third lens may both be concave surfaces. An object-side surface and an image-side surface of the fourth lens may both be convex surfaces. An object-side surface and an image-side surface of the fifth lens may both be convex surfaces. An object-side surface and an image-side surface of the sixth lens may both be concave surfaces. An object-side surface of the seventh lens may be a convex surface, and an image-side surface of the seventh lens may be a concave surface.

In some exemplary embodiments, a stop for restricting light beams may be arranged between, for example, the third lens and the fourth lens, to further improve the imaging quality of the lens assembly. When the stop is arranged between the third lens and the fourth lens, it may be beneficial to effectively converge the light entering the optical system, shorten the total length of the optical system, and reduce the aperture of the front and rear lens groups. However, it should be noted that the position of the stop arranged here is only an example and not a limitation; in an alternative embodiment, the stop may also be arranged in other positions according to actual needs.

In some exemplary embodiments, the optical lens assembly may further include an optical filter disposed between the seventh lens and the imaging plane to filter lights of different wavelengths, as desired. Also, the optical lens assembly may further include a cover glass disposed between the optical filter and the imaging plane to prevent damage to an internal element (e.g., a chip) of the optical lens assembly.

As known to those skilled in the art, a cemented lens may be used to minimize or eliminate chromatic aberrations. The use of a cemented lens in an optical lens assembly can improve the image quality and reduce the reflection losses of light energy, thereby improving the sharpness of imaging of the lens assembly. In addition, the use of a cemented lens may also simplify the assembly procedure in a lens assembly manufacturing process.

In some exemplary embodiments, the fifth lens and the sixth lens may be combined into a cemented lens by cementing the image-side surface of the fifth lens and the object-side surface of the sixth lens. The cemented lens is a double cemented lens, which consists of a positive lens (i.e., the fifth lens) and a negative lens (i.e., the sixth lens), where the positive lens has a lower refractive index and the negative lens has a higher refractive index (relative to the positive lens). The combination of high and low refractive indexes may facilitate a rapid transition of front light and increase the aperture of the stop, to meet the needs of night vision. In the double cemented lens, the positive lens is arranged in the front and the negative lens is arranged in the rear, which may further converge the front light and then transition to the rear. The doublet cemented lens itself may achromatize by itself, reduce tolerance sensitivity, and may also remain some chromatic aberration to balance the chromatic aberration of the system. In addition, the use of the double cemented lens may make the overall structure of the optical system compact, meet the miniaturization requirement, and reduce the tolerance sensitivity issues such as tilt/eccentricity of the lens unit during the assembly process.

In some exemplary embodiments, an axial distance d12 from a center of the image-side surface of the first lens to a center of the object-side surface of the second lens and a total track length TTL of the optical lens assembly may satisfy: $d12/TTL \leq 0.25$, more ideally, $d12/TTL \leq 0.2$ may be further satisfied. Satisfying the conditional formula $d12/TTL \leq 0.25$ may make the light transit smoothly, which is beneficial to improve the image quality.

In some exemplary embodiments, a maximum field-of-view FOV of the optical lens assembly, a total focal length value F of the optical lens assembly, and an image height H corresponding to the maximum field-of-view of the optical lens assembly may satisfy: $(FOV \times F)/H \geq 45$, more ideally, $(FOV \times F)/H \geq 50$ may be further satisfied. Satisfying the conditional formula $(FOV \times F)/H \geq 45$ may achieve a large-angle resolution, which helps to improve the effect of the entire lens assembly while taking into account a huge field-of-view and telephoto.

In some exemplary embodiments, an axial distance d34 from a center of the image-side surface of the third lens to a center of the object-side surface of the fourth lens and an axial distance d45 from a center of the image-side surface of the fourth lens to a center of the object-side surface of the fifth lens may satisfy: $d34/d45 \leq 1.6$, more ideally, $d34/d45 \leq 1.45$ may be further satisfied. By setting the distance between two adjacent lenses to be close, it may help smooth transition of light.

In some exemplary embodiments, a maximum field-of-view FOV of the optical lens assembly, a maximum aperture diameter D of the object-side surface of the first lens corresponding to the maximum field-of-view of the optical lens assembly, and an image height H corresponding to the maximum field-of-view of the optical lens assembly may satisfy: $D/H/FOV \leq 0.025$, more ideally, $D/H/FOV \leq 0.02$ may be further satisfied. Satisfying the conditional formula $D/H/FOV \leq 0.025$ may ensure a small diameter at the front.

In some exemplary embodiments, a total track length TTL of the optical lens assembly, a maximum field-of-view FOV of the optical lens assembly, and an image height H corresponding to the maximum field-of-view of the optical lens assembly may satisfy: $TTL/H/FOV \leq 0.035$, more ideally, $TTL/H/FOV \leq 0.03$ may be further satisfied. Satisfying the conditional formula $TTL/H/FOV \leq 0.035$ may achieve miniaturization, and compared with other lens assemblies, TTL is shorter on the same imaging plane in the same field-of-view.

In some exemplary embodiments, an opening angle of the image-side surface of the first lens under a maximum field-of-view of the optical lens assembly may satisfy: $\arctan(SAG2/d2) \geq 45$, more ideally, $\arctan(SAG2/d2) \geq 50$ may be further satisfied, where d2 is a half-diameter of a maximum aperture diameter of the image-side surface of the first lens corresponding to a maximum field-of-view of the optical lens assembly, and SAG2 is a sagittal height of the image-side surface of the first lens corresponding to the maximum field-of-view of the optical lens assembly. Satisfying the conditional formula $\arctan(SAG2/d2) \geq 45$, may help improve the illuminance, reduce distortion, and help improve an overall lens assembly effect while taking into account a huge field-of-view and telephoto.

In some exemplary embodiments, a focal length value F4 of the fourth lens and a focal length value F5 of the fifth lens may satisfy: $0.5 \leq |F4/F5| \leq 3$, more ideally, $0.7 \leq |F4/F5| \leq 2.7$ may be further satisfied. By setting the focal lengths of the two adjacent lenses to be close, it may help the light transition smoothly and improve the image quality.

In some exemplary embodiments, a focal length value F7 of the seventh lens and a total focal length value F of the optical lens assembly may satisfy: $F7/F \leq 5$, more ideally, F7/F≤4.6 may be further satisfied. By setting the seventh lens of the last lens to have a short focal length, it may help collect light to ensure the amount of light.

In some exemplary embodiments, a lens group length TL of the optical lens assembly and a total focal length value F of the optical lens assembly may satisfy: TL/F≤15, more ideally, TL/F≤14 may be further satisfied. Satisfying the conditional formula TL/F≤15 may achieve miniaturization.

In some exemplary embodiments, a focal length value F2 of the second lens and a total focal length value F of the optical lens assembly may satisfy: 2≤|F2/F|≤6, more ideally, 2.3≤|F2/F|≤5.6 may be further satisfied. Satisfying the conditional formula 2≤|F2/F|≤6, may effectively converge large-angle light, so that the light can smoothly enter the rear optical system.

In some exemplary embodiments, a temperature coefficient of refractive index dn/dt(5) of the fifth lens and a temperature coefficient of refractive index dn/dt(6) of the sixth lens may satisfy: −3E-05≤dn/dt(5)+dn/dt(6)≤−1E-05. The fifth lens and the sixth lens can effectively compensate for the influence of temperature changes on the focal length of the wide-angle lens assembly, and further improve the stability of resolution of the wide-angle lens assembly at different temperatures.

In some exemplary embodiments, the optical lens assembly includes at least 3 aspheric lenses. For example, the second lens, the fourth lens, and the seventh lens may all be aspheric lenses. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the imaging quality of the lens assembly. For example, the use of an aspheric lens for the first lens may further improve the resolution quality. The seventh lens adopts an aspheric lens to reduce an optical path of the peripheral light reaching the imaging plane, at the same time correct an off-axis point aberration of the system, and optimize the optical performance such as distortion and CRA. It should be understood that the optical lens assembly according to exemplary embodiments of the present disclosure may appropriately increase the number of spherical or aspheric lenses in a specific application field.

On the other hand, the first lens may have negative refractive power, an object-side surface of the first lens may be a convex surface, and an image-side surface of the first lens may be a concave surface. The first lens is set as a meniscus shape with the convex surface towards the object side, which is conducive to collecting light from a large field-of-view as much as possible and allowing the light to enter the rear optical system, increase the amount of light passing, and at the same time help achieve an overall large field-of-view range. In practical applications, considering the outdoor installation and use environment of on-board lens assemblies, setting the first lens with the object-side surface being a convex surface is conducive to the dripping of water droplets on the object-side surface, thereby reducing the influence on imaging quality of the lens assemblies caused by severe weather conditions such as rain and snow. In addition, the first lens may be made of a high refractive index material having a refractive index of 1.65 or higher to reduce diameter of the front port.

The second lens may have negative refractive power, an object-side surface of the second lens may be a convex surface or a concave surface, and an image-side surface of the second lens may be a concave surface. Arranging the second lens as a negative lens can appropriately compress the light collected by the first lens to make the light trend transition smoothly. In addition, the image-side surface of the second lens is a concave surface, which may also help reduce a distance between the first lens and the second lens, thereby helping shorten a total length of the lens assembly to achieve miniaturization.

The third lens may have negative refractive power, an object-side surface of the third lens may be a convex surface or a concave surface, and an image-side surface of the third lens may be a convex surface or a concave surface. Arranging the third lens as a negative lens may balance a spherical aberration and positional chromatic aberration introduced by the preceding two lenses, and at the same time may help reduce the overall length of the optical system.

The fourth lens may have positive refractive power, an object-side surface of the fourth lens may be a convex surface, and an image-side surface of the fourth lens may be a convex surface. This configuration of the fourth lens may make divergent light enter into the rear lens smoothly, compress the light, and make the light trend transition smoothly.

The fifth lens may have positive refractive power, an object-side surface of the fifth lens may be a convex surface, and an image-side surface of the fifth lens may be a convex surface. The sixth lens may have negative refractive power, an object-side surface of the sixth lens may be a concave surface, and an image-side surface of the sixth lens may be a concave surface. The seventh lens may have positive refractive power, an object-side surface of the seventh lens may be a convex surface, and an image-side surface of the seventh lens may be a convex surface.

Alternatively, a stop for restricting light beams may be arranged between, for example, the fourth lens and the fifth lens, to further improve the imaging quality of the lens assembly. When the stop is arranged between the fourth lens and the fifth lens, it may be beneficial to effectively converge the light entering the optical system, shorten the total length of the optical system, and reduce the aperture of the optical system. In an exemplary embodiment, the stop may be arranged near the image-side surface of the fourth lens. However, it should be noted that the position of the stop disclosed here is only an example and not a limitation; in an alternative embodiment, the stop may also be arranged in other positions according to actual needs.

In some exemplary embodiments, the optical lens assembly may further include an optical filter disposed between the seventh lens and the imaging plane to filter light having different wavelengths, as desired. Also, the optical lens assembly may further include a cover glass disposed between the optical filter and the imaging plane to prevent damage to an internal element (e.g., a chip) of the optical lens assembly.

As known to those skilled in the art, a cemented lens may be used to minimize or eliminate chromatic aberrations. The use of a cemented lens in an optical lens assembly can improve the image quality and reduce the reflection losses of light energy, thereby improving the sharpness of imaging of the lens assembly. In addition, the use of a cemented lens may also simplify the assembly procedure in a lens assembly manufacturing process.

In some exemplary embodiments, the fifth lens, sixth lens, and seventh lens may be combined into a triplet cemented lens by cementing the image-side surface of the fifth lens with the object-side surface of the sixth lens and cementing the image-side surface of the sixth lens with the object-side surface of the seventh lens. In this triplet cemented lens, the fifth lens has positive refractive power, the sixth lens has negative refractive power, and the seventh lens has positive refractive power. Based on this, the light in front of the optical system may be smoothly transitioned to the seventh lens. The seventh lens, serving as a converging lens, may effectively and smoothly converge the light at the end, so that the light reaches the imaging plane smoothly, thereby reducing the total length of the optical system.

The triplet cemented lens may have at least one of the following advantages: reducing the air intervals between the three lenses, thereby reducing the overall length of the optical system; reducing the assembly components between the fifth lens and the seventh lens, reducing the tolerance sensitivity of the lenses to the tilt/eccentricity generated in the assembly process, thereby reducing the process and reducing the cost; and reducing the light loss caused by reflection between the lenses, thereby improving the illuminance. Such a cemented design shares the overall chromatic aberration correction of the system, effectively corrects aberrations, improves the resolution, and makes the overall optical system compact to meet the requirement of miniaturization.

In some exemplary embodiments, a distance TL from a center of the object-side surface of the first lens to a center of the image-side surface of the seventh lens and a total effective focal length F of the optical lens assembly may satisfy: $TL/F \leq 15$. More ideally, $TL/F \leq 14$ may be further satisfied. Satisfying the conditional formula $TL/F \leq 15$ may ensure the miniaturization characteristics of the optical system.

In some exemplary embodiments, a distance TTL from a center of the object-side surface of the first lens to the imaging plane of the optical lens assembly, an image height H corresponding to a maximum field-of-view of the optical lens assembly, and the maximum field-of-view FOV of the optical lens assembly may satisfy: $TTL/H/FOV \leq 0.035$. More ideally, $TTL/H/FOV \leq 0.03$ may be further satisfied. Satisfying the conditional formula $TTL/H/FOV \leq 0.035$ may ensure the miniaturization characteristics of the optical system. For example, compared with other lens assemblies that do not satisfy the conditional formula, when the size of the field-of-view and the size of the imaging plane are the same, the optical lens assembly of the exemplary embodiment of the present disclosure that satisfies the conditional formula has a shorter TTL.

In some exemplary embodiments, a maximum aperture diameter D of the object-side surface of the first lens corresponding to the maximum field-of-view of the optical lens assembly, the image height H corresponding to the maximum field-of-view of the optical lens assembly, and the maximum field-of-view FOV of the optical lens assembly may satisfy: $D/H/FOV \leq 0.025$. More ideally, $D/H/FOV \leq 0.02$ may be further satisfied. Satisfying the conditional formula $D/H/FOV \leq 0.025$, a small diameter at the front port may be realized.

In some exemplary embodiments, the maximum field-of-view FOV of the optical lens assembly, the total effective focal length F of the optical lens assembly, and the image height H corresponding to the maximum field-of-view of the optical lens assembly may satisfy: $(FOV \times F)/H \geq 45$. More ideally, $(FOV \times F)/H \geq 47$ may be further satisfied. Satisfying the conditional formula $(FOV \times F)/H \geq 45$ may achieve a large-angle resolution, which helps to take into account a huge field-of-view and telephoto characteristics.

In some exemplary embodiments, a distance d12 from a center of the image-side surface of the first lens to a center of the object-side surface of the second lens and the distance TTL from the center of the object-side surface of the first lens to the imaging plane of the optical lens assembly may satisfy: $d12/TTL \leq 0.3$. More ideally, $d12/TTL \leq 0.25$ may be further satisfied. Satisfying the conditional formula $d12/TTL \leq 0.3$ may help reduce an optical aperture of the first lens.

In some exemplary embodiments, an effective focal length F4 of the fourth lens and an effective focal length F5 of the fifth lens may satisfy: $F4/F5 \leq 3$. More ideally, $0.5 \leq F4/F5 \leq 2$ may be further satisfied. Satisfying the conditional formula $F4/F5 \leq 3$ may help the light transition smoothly between the fourth lens and the fifth lens.

In some exemplary embodiments, an effective focal length F3 of the third lens and a radius of curvature R5 of the object-side surface of the third lens may satisfy: $|F3/R5| \leq 5$. More ideally, $|F3/R5| \leq 4$ may be further satisfied. Satisfying the conditional formula $|F3/R5| \leq 5$ may ensure that the third lens better condenses the light in front of the third lens to help reduce diameter at the rear port of the optical lens assembly, thereby reducing the volume of the optical lens assembly.

In some exemplary embodiments, an effective focal length F2 of the second lens and the total effective focal length F of the optical lens assembly may satisfy: $1.5 \leq |F2/F| \leq 4.5$. More ideally, $1.8 \leq |F2/F| \leq 4$ may be further satisfied. Satisfying the conditional formula $1.5 \leq |F2/F| \leq 4.5$ may help effectively condense large-angle light, so that the light can smoothly enter the rear optical system.

In some exemplary embodiments, a combined focal length F567 of the fifth lens, the sixth lens, and the seventh lens and the total effective focal length F of the optical lens assembly may satisfy: $2 \leq F567/F \leq 7$. More ideally, $2.5 \leq F567/F \leq 6.5$ may be further satisfied. Satisfying the conditional formula $2 \leq F567/F \leq 7$ may help eliminate chromatic aberrations, achieve long back focus length, and reduce CRA.

Figure 14:
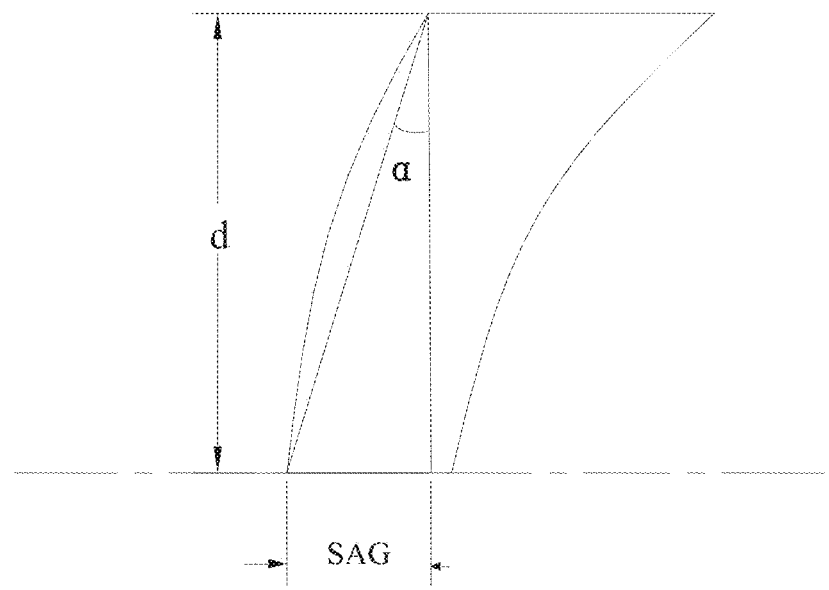
FIG. 14 schematically shows a half-diameter d of a maximum aperture diameter of an object-side surface of a lens and its corresponding sagittal height Sg value SAG.

In some exemplary embodiments, an opening angle of the image-side surface of the first lens under the maximum field-of-view may be above 45°. This relationship may be expressed as: $\arctan(SAG2/d2) \geq 45°$, where the number 2 indicates the image-side surface of the first lens. FIG. 14 shows this opening angle α using an object-side surface of a lens as an example. As shown in FIG. 14, d indicates a half-diameter of a maximum aperture diameter, and SAG represents a sagittal height SG value corresponding to the half-diameter of the maximum aperture diameter. The opening angle of the object-side surface of the lens under the maximum field-of-view shown in FIG. 14 $\alpha = \arctan(SAG/d)$. More ideally, $\arctan(SAG2/d2) \geq 50°$ may be further satisfied. Satisfying the conditional formula $\arctan(SAG2/d2) \geq 45°$ may help improve the illuminance, reduce distortion, and help take into account a huge field-of-view and telephoto characteristics.

In some exemplary embodiments, a temperature coefficient of refractive index dn/dt(5) of the fifth lens and a temperature coefficient of refractive index dn/dt(6) of the sixth lens satisfy: $-3 \times 10^{-5} \leq dn/dt(5) + dn/dt(6) \leq -2 \times 10^{-5}$. The temperature coefficient of refractive index dn/dt(5) of the fifth lens indicates the change in material refractive index of the fifth lens with temperature. The temperature coefficient of refractive index dn/dt(6) of the sixth lens indicates the change in material refractive index of the sixth lens with temperature. When constructing the fifth lens and the sixth lens, selecting appropriate materials may enable the fifth lens and the sixth lens to effectively compensate for the influence of temperature changes on the focal length of the optical lens assembly, thereby further improving the stability of resolution of the optical lens assembly at different temperatures.

In some exemplary embodiments, the optical lens assembly includes at least 3 aspheric lenses. For example, the second lens, the third lens, and the fourth lens may all be aspheric lenses. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the imaging quality of the lens assembly. For example, the use of an aspheric lens for the first lens may further improve the resolution quality. The seventh lens adopts an aspheric lens to reduce an optical path of the peripheral light reaching the imaging plane, at the same time correct an off-axis point aberration of the system, and optimize the optical performance such as distortion and CRA. It should be understood that the optical lens assembly according to the present disclosure may appropriately increase the number of spherical or aspheric lenses in a specific application field. For example, in the case of focusing on the resolution quality, the first lens to the seventh lens may all adopt aspheric lenses.

In some exemplary embodiments, the first lens may employ a glass lens. Generally, the coefficient of thermal expansion of the lens made of the plastic material is large, and when the ambient temperature of the lens assembly changes greatly, the plastic lens will cause a large change in the optical back focal length of the lens assembly. Using lenses made of glass material may reduce the effect on the optical back focal length of the lens assembly caused by temperature, but the cost is high. Ideally, the first lens may adopt a glass aspheric lens to further improve the imaging quality and reduce diameter at the front port. It should be understood that, in order to improve the stability of the lens assembly, the number of glass lenses adopted in the optical lens assembly according to embodiments of the present disclosure may be increased. For example, when focusing on the temperature performance of the optical lens assembly, the first lens to the seventh lens may all adopt glass lenses to ensure the stability of the optical performance at different temperatures; and when focusing on the cost, glass-plastic combination or even all-plastic lenses may be used to reduce the cost.

The optical lens assembly according to above embodiments of the present disclosure may reduce diameter at the front port, shorten the TTL, and improve the resolution while ensuring the miniaturization of the lens assembly by optimizing the shape of the lenses, rationally distributing the refractive power, and rationally selecting the lens material. The optical lens assembly adopts 7 lenses, may reach more than 4 million pixels, can achieve higher definition. The optical lens assembly has a small CRA, which prevents generation of stray light from hitting a lens barrel when the rear end of the light exits, and may be well matched with, for example, on-board chips, without color cast and vignetting. The optical lens assembly has a longer focal length, and the central area has a large angle resolution compared with the conventional wide-angle lens assembly, which may improve the recognition of environmental objects and increase the detection area of the central part in a targeted approach. The optical lens assembly may adopt a full glass architecture, has good temperature performance, small changes in imaging effects at high and low temperatures, and stable image quality, which greatly improves the safety of automatic driving and is beneficial to most environments where vehicles are used. Therefore, the optical lens assembly according to above embodiments of the present disclosure can better meet the requirements of, for example, on-board applications.

Those skilled in the art should understand that the total track length TTL of the optical lens assembly used above refers to an axial distance from the center of the object-side surface of the first lens to the center of the imaging plane; and the lens group length TL of the optical lens assembly refers to an axial distance from the center of the object-side surface of the first lens to the center of the image-side surface of the seventh lens of the last lens.

However, it should be understood by those skilled in the art that the number of lenses constituting the lens assembly may be varied to obtain the various results and advantages described in this specification without departing from the technical solution described in embodiments of the present disclosure. For example, although the embodiment is described by taking seven lenses as an example, the optical lens assembly is not limited to include seven lenses. The optical lens assembly may also include other numbers of lenses if desired.

Embodiments of an optical lens assembly applicable to implementations will be further described below with reference to the accompanying drawings.

Embodiment 1

An optical lens assembly according to Embodiment 1 of the present disclosure is described below with reference to FIG. 1. FIG. 1 illustrates a schematic structural diagram of the optical lens assembly according to Embodiment 1 of the present disclosure.

As shown in FIG. 1, the optical lens assembly, from an object side to an image side along an optical axis sequentially includes: a first lens L1, a second lens L2, a third lens L3, a fourth lens L4, a fifth lens L5, a sixth lens L6 and a seventh lens L7.

The first lens L1 is a meniscus lens having negative refractive power, an object-side surface S1 of the first lens is a convex surface, and an image-side surface S2 of the first lens is a concave surface.

The second lens L2 is a meniscus lens having negative refractive power, an object-side surface S3 of the second lens is a convex surface, and an image-side surface S4 of the second lens is a concave surface.

The third lens L3 is a meniscus lens having negative refractive power, an object-side surface S5 of the third lens is a convex surface, and an image-side surface S6 of the third lens is a concave surface.

The fourth lens L4 is a biconvex lens having positive refractive power, an object-side surface S8 and an image-side surface S9 of the fourth lens are both convex surfaces.

The fifth lens L5 is a biconvex lens having positive refractive power, an object-side surface S10 and an image-side surface S11 of the fifth lens are both convex surfaces. The sixth lens L6 is a biconcave lens having negative refractive power, an object-side surface S11 and an image-side surface S12 of the sixth lens are both concave surfaces. The fifth lens L5 and the sixth lens L6 are cemented to form a cemented lens.

The seventh lens L7 is a biconvex lens having positive refractive power, an object-side surface S13 and an image-side surface S14 of the seventh lens are both convex surfaces.

The second lens L2, the fourth lens L4, and the seventh lens L7 are all aspheric lenses, and their respective object-side surfaces and image-side surfaces are all aspheric.

Alternatively, the optical lens assembly may further include an optical filter L8 having an object-side surface S15 and an image-side surface S16 and/or a cover lens L8'. The optical filter L8 may be used to correct color deviations. The cover lens L8' may be used to protect an image sensor chip located on an imaging plane IMA. Light from an object sequentially passes through the respective surfaces S1 to S16 and finally images on the imaging plane IMA.

In the optical lens assembly of the present embodiment, a stop STO may be disposed between the third lens L3 and the fourth lens L4 to improve imaging quality.

Table 1 shows the radius of curvature R, the thickness T (it should be understood that $T_1$ is the center thickness of the first lens L1, and $T_2$ is the air interval between the first lens L1 and the second lens L2, and so on), the refractive index Nd, and the abbe number Vd of each lens of the optical lens assembly of example 1. The unit of the radius of curvature R and the thickness T is millimeter (mm).

TABLE 1

| Surface number | Radius of curvature R | Thickness T | Refractive index Nd | Abbe number Vd |
|---|---|---|---|---|
| 1 | 18.2714 | 1.1031 | 1.78 | 49.62 |
| 2 | 5.2036 | 3.4087 | | |
| 3 | 15.7500 | 0.9000 | 1.79 | 47.25 |
| 4 | 4.4330 | 2.0714 | | |
| 5 | 162.3933 | 4.2600 | 1.49 | 71.40 |
| 6 | 5.8889 | 1.9368 | | |
| STO | Infinite | 0.0000 | | |
| 8 | 4.8705 | 2.1700 | 1.67 | 56.12 |
| 9 | −8.6212 | 1.7421 | | |
| 10 | 4.6700 | 2.7000 | 1.50 | 82.10 |
| 11 | −3.1500 | 0.9000 | 1.77 | 25.73 |
| 12 | 6.8300 | 0.4220 | | |
| 13 | 4.9000 | 2.0900 | 1.59 | 61.12 |
| 14 | −21.5574 | 0.1485 | | |
| 15 | Infinite | 0.5500 | 1.52 | 64.21 |
| 16 | Infinite | 1.6805 | | |
| IMA | Infinite | | | |

The present embodiment employs seven lenses as an example. The lens assembly may have at least one beneficial effect, such as a high resolution, miniaturization, a small diameter at the front-end, a good temperature performance, a huge field-of-view, telephoto and the like, by rationally configuring the refractive power, the surface shape, the center thickness of each lens, and the air interval between the lenses. The surface shape Z of each aspheric surface is defined by the following formula:

$$Z(h) = \frac{ch^2}{1 + \sqrt{1-(k+1)c^2h^2}} + Ah^2 + Bh^6 + Ch^8 + Dh^{10} + Eh^{12} \quad (1)$$

Where, Z is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is the conic coefficient conic; and A, B, C, D, E are high-order coefficients. Table 2 below shows the conic coefficient K and the high-order coefficients A, B, C, D and E applicable to aspheric surfaces S3-S4, S8-S9, and S13-S14 in embodiment 1.

TABLE 2

| Surface number | K | A | B | C | D | E |
|---|---|---|---|---|---|---|
| 3 | 0.1083 | 9.5353E−04 | −4.4066E−05 | −5.7293E−08 | 2.3944E−08 | 2.8166E−10 |
| 4 | −0.1000 | 1.9106E−03 | 5.3923E−05 | −4.8911E−07 | −1.6732E−07 | −7.3545E−10 |
| 8 | 0.8057 | −1.3057E−03 | −2.4559E−05 | 6.6165E−09 | −7.4881E−09 | 1.0546E−07 |
| 9 | −15.5425 | −1.7463E−03 | 2.6432E−04 | 1.1092E−05 | −4.3984E−06 | 5.3271E−07 |
| 13 | −1.0000 | −1.7299E−03 | −1.8049E−04 | 3.6232E−05 | −6.5997E−06 | 2.1777E−07 |
| 14 | −135.0504 | 1.4724E−03 | −2.9475E−04 | 4.5532E−05 | −6.5758E−06 | 3.1989E−07 |

Embodiment 2

Figure 2:
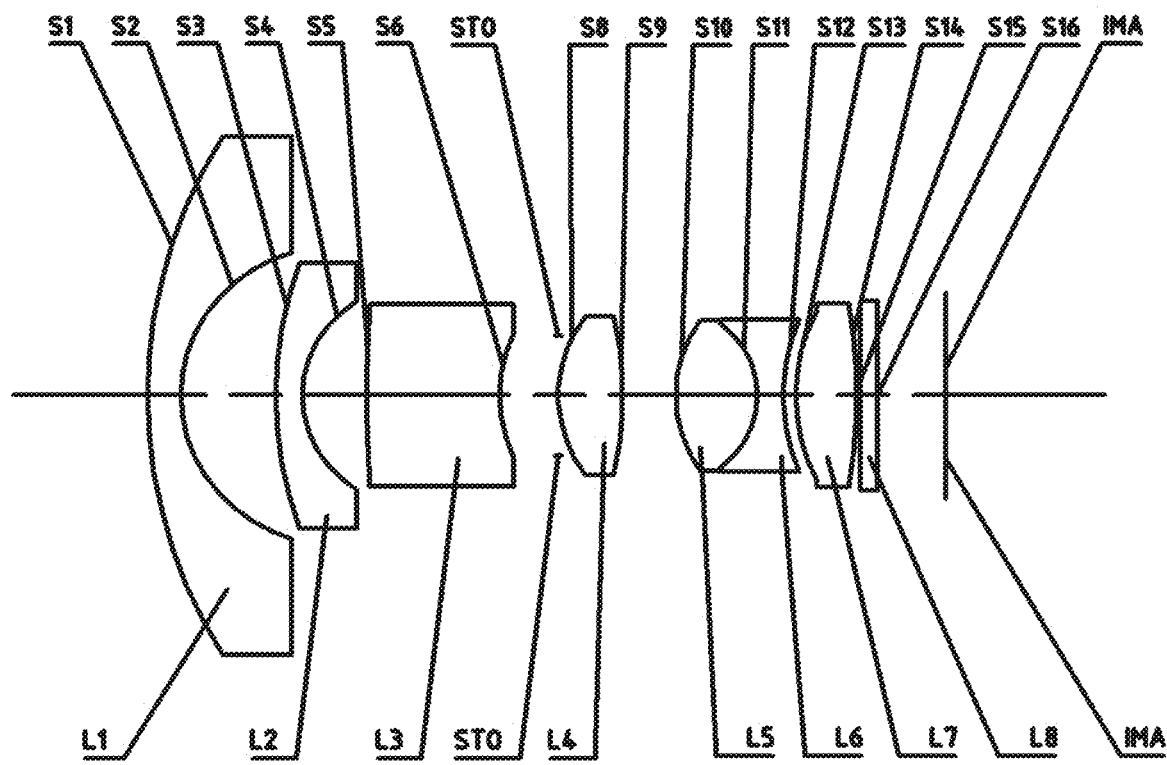
FIG. 2 illustrates a schematic structural diagram of an optical lens assembly according to Embodiment 2 of the present disclosure.

An optical lens assembly according to Embodiment 2 of the present disclosure is described below with reference to FIG. 2. In this Embodiment and the following Embodiment, the same description as in Embodiment 1 will be omitted for brevity. FIG. 2 illustrates a schematic structural diagram of the optical lens assembly according to Embodiment 2 of the present disclosure.

As shown in FIG. 2, the optical lens assembly, from an object side to an image side along an optical axis sequentially includes: a first lens L1, a second lens L2, a third lens L3, a fourth lens L4, a fifth lens L5, a sixth lens L6 and a seventh lens L7.

The first lens L1 is a meniscus lens having negative refractive power, an object-side surface S1 of the first lens is a convex surface, and an image-side surface S2 of the first lens is a concave surface.

The second lens L2 is a meniscus lens having negative refractive power, an object-side surface S3 of the second lens is a convex surface, and an image-side surface S4 of the second lens is a concave surface.

The third lens L3 is a meniscus lens having negative refractive power, an object-side surface S5 of the third lens is a convex surface, and an image-side surface S6 of the third lens is a concave surface.

The fourth lens L4 is a biconvex lens having positive refractive power, an object-side surface S8 and an image-side surface S9 of the fourth lens are both convex surfaces.

The fifth lens L5 is a biconvex lens having positive refractive power, an object-side surface S10 and an image-side surface S11 of the fifth lens are both convex surfaces. The sixth lens L6 is a biconcave lens having negative refractive power, an object-side surface S11 and an image-side surface S12 of the sixth lens are both concave surfaces. The fifth lens L5 and the sixth lens L6 are cemented to form a cemented lens.

The seventh lens L7 is a biconvex lens having positive refractive power, an object-side surface S13 and an image-side surface S14 of the seventh lens are both convex surfaces.

The second lens L2, the third lens L3, the fourth lens L4, and the seventh lens L7 are all aspheric lenses, and their respective object-side surfaces and image-side surfaces are all aspheric.

Alternatively, the optical lens assembly may further include an optical filter L8 having an object-side surface S15 and an image-side surface S16 and/or a cover lens L8'. The optical filter L8 may be used to correct color deviations. The cover lens L8' may be used to protect an image sensor chip located on an imaging plane IMA. Light from an object sequentially passes through the respective surfaces S1 to S16 and finally images on the imaging plane IMA.

In the optical lens assembly of the present embodiment, a stop STO may be disposed between the third lens L3 and the fourth lens L4 to improve imaging quality.

Table 3 shows the radius of curvature R, the thickness T, the refractive index Nd, and the abbe number Vd of each lens of the optical lens assembly of Embodiment 2. The unit of the radius of curvature R and the thickness T is millimeter (mm). Table 4 below shows the conic coefficient K and the high-order coefficients A, B, C, D and E applicable to aspheric surfaces S3-S6, S8-S9, and S13-S14 in Embodiment 2.

TABLE 3

| Surface number | Radius of curvature R | Thickness T | Refractive index Nd | Abbe number Vd |
|---|---|---|---|---|
| 1 | 17.6000 | 1.0900 | 1.78 | 48.50 |
| 2 | 5.2204 | 3.1241 | | |
| 3 | 14.9910 | 0.8800 | 1.80 | 46.30 |
| 4 | 4.4157 | 2.1045 | | |
| 5 | 94.7339 | 4.3797 | 1.49 | 70.40 |
| 6 | 5.9250 | 1.9318 | | |
| STO | Infinite | 0.0000 | | |
| 8 | 4.8695 | 2.1179 | 1.66 | 58.12 |
| 9 | −8.5359 | 1.7421 | | |
| 10 | 4.7002 | 2.6899 | 1.48 | 82.60 |
| 11 | −3.1680 | 0.8412 | 1.78 | 25.72 |
| 12 | 6.9372 | 0.4220 | | |
| 13 | 4.9292 | 1.9843 | 1.59 | 61.12 |
| 14 | −21.2573 | 0.1485 | | |
| 15 | Infinite | 0.5500 | 1.52 | 64.21 |
| 16 | Infinite | 2.2619 | | |
| IMA | Infinite | | | |

TABLE 4

| Surface number | K | A | B | C | D | E |
|---|---|---|---|---|---|---|
| 3 | 1.0098 | 9.9195E−04 | −4.2904E−05 | −5.5016E−07 | 2.3333E−08 | 8.2277E−11 |
| 4 | 0.1500 | 1.9136E−03 | 6.4744E−05 | −9.5979E−07 | −2.2996E−07 | −3.3352E−12 |
| 5 | 0.1200 | 9.5024E−04 | −4.4317E−05 | −5.7906E−07 | 2.4273E−08 | 2.2584E−10 |
| 6 | −0.2000 | 1.9407E−03 | 4.6640E−05 | −3.8736E−07 | −1.5293E−07 | −9.8311E−18 |
| 8 | 0.8114 | −1.2979E−03 | −2.2176E−05 | −2.9492E−08 | −3.2374E−08 | 1.1790E−07 |
| 9 | −15.0000 | −1.7456E−03 | 2.5612E−04 | 1.0546E−05 | −4.2683E−06 | 7.0187E−07 |
| 13 | −0.6569 | −1.7007E−03 | −1.6632E−04 | 3.6791E−05 | −6.8874E−06 | 3.2064E−07 |
| 14 | −112.0000 | 1.7941E−03 | −2.7796E−04 | 4.6635E−05 | −7.5145E−06 | 3.1890E−07 |

Embodiment 3

Figure 3:
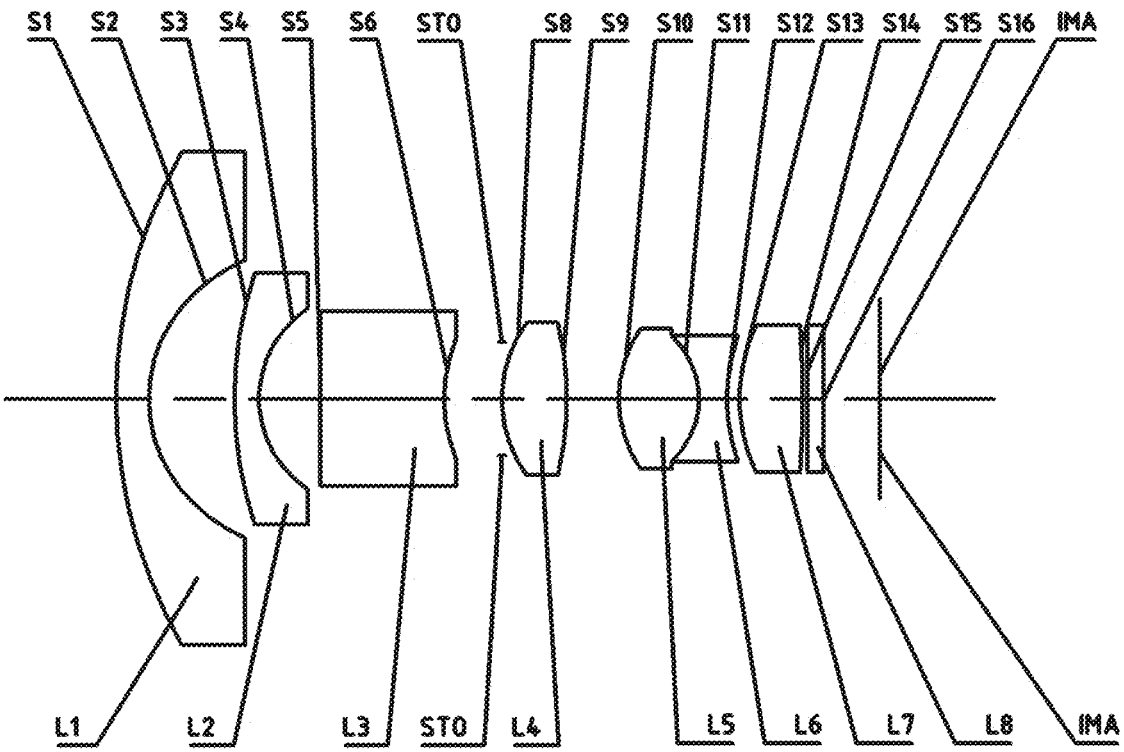
FIG. 3 illustrates a schematic structural diagram of an optical lens assembly according to Embodiment 3 of the present disclosure.

An optical lens assembly according to Embodiment 3 of the present disclosure is described below with reference to FIG. 3. In this Embodiment and the following Embodiments, the same description as in Embodiment 1 will be omitted for brevity. FIG. 3 illustrates a schematic structural diagram of the optical lens assembly according to Embodiment 3 of the present disclosure.

As shown in FIG. 3, the optical lens assembly, from an object side to an image side along an optical axis sequentially includes: a first lens L1, a second lens L2, a third lens L3, a fourth lens L4, a fifth lens L5, a sixth lens L6 and a seventh lens L7.

The first lens L1 is a meniscus lens having negative refractive power, an object-side surface S1 of the first lens is a convex surface, and an image-side surface S2 of the first lens is a concave surface.

The second lens L2 is a meniscus lens having negative refractive power, an object-side surface S3 of the second lens is a convex surface, and an image-side surface S4 of the second lens is a concave surface.

The third lens L3 is a meniscus lens having negative refractive power, an object-side surface S5 of the third lens is a convex surface, and an image-side surface S6 of the third lens is a concave surface.

The fourth lens L4 is a biconvex lens having positive refractive power, an object-side surface S8 and an image-side surface S9 of the fourth lens are both convex surfaces.

The fifth lens L5 is a biconvex lens having positive refractive power, an object-side surface S10 and an image-side surface S11 of the fifth lens are both convex surfaces. The sixth lens L6 is a biconcave lens having negative refractive power, an object-side surface S11 and an image-side surface S12 of the sixth lens are both concave surfaces. The fifth lens L5 and the sixth lens L6 are cemented to form a cemented lens.

The seventh lens L7 is a biconvex lens having positive refractive power, an object-side surface S13 and an image-side surface S14 of the seventh lens are both convex surfaces.

The second lens L2, the fourth lens L4, and the seventh lens L7 are all aspheric lenses, and their respective object-side surfaces and image-side surfaces are all aspheric.

Alternatively, the optical lens assembly may further include an optical filter L8 having an object-side surface S15 and an image-side surface S16 and/or a cover lens L8'. The optical filter L8 may be used to correct color deviations. The cover lens L8' may be used to protect an image sensor chip located on an imaging plane IMA. Light from an object sequentially passes through the respective surfaces S1 to S16 and is finally imaged on the imaging plane IMA.

In the optical lens assembly of the present embodiment, a stop STO may be disposed between the third lens L3 and the fourth lens L4 to improve imaging quality.

Table 5 shows the radius of curvature R, the thickness T, the refractive index Nd, and the abbe number Vd of each lens of the optical lens assembly of Embodiment 3. The unit of the radius of curvature R and the thickness T is millimeter (mm). Table 6 below shows the conic coefficient K and the high-order coefficients A, B, C, D and E applicable to aspheric surfaces S3-S4, S8-S9, and S13-S14 in Embodiment 3.

TABLE 5

| Surface number | Radius of curvature R | Thickness T | Refractive index Nd | Abbe number Vd |
|---|---|---|---|---|
| 1 | 18.1331 | 1.1031 | 1.78 | 52.17 |
| 2 | 5.3163 | 2.8572 | | |
| 3 | 15.3720 | 0.8300 | 1.81 | 45.50 |
| 4 | 4.4224 | 2.0257 | | |
| 5 | 140.3007 | 4.1700 | 1.49 | 70.40 |
| 6 | 5.8705 | 1.9318 | | |
| STO | Infinite | 0.0000 | | |
| 8 | 4.8696 | 2.1800 | 1.67 | 56.12 |
| 9 | −8.6674 | 1.7421 | | |
| 10 | 4.6500 | 2.6900 | 1.50 | 84.31 |
| 11 | −3.1432 | 0.9300 | 1.78 | 25.33 |
| 12 | 6.8612 | 0.4220 | | |
| 13 | 4.9271 | 2.1300 | 1.59 | 61.12 |
| 14 | −20.8712 | 0.1485 | | |
| 15 | Infinite | 0.5500 | 1.52 | 64.21 |
| 16 | Infinite | 1.8678 | | |
| IMA | Infinite | | | |

TABLE 6

| Surface number | K | A | B | C | D | E |
|---|---|---|---|---|---|---|
| 3 | 0.1500 | 9.5593E−04 | −4.4215E−05 | −5.7727E−07 | 2.2232E−08 | 2.1858E−10 |
| 4 | 0.1000 | 1.9185E−03 | 4.6560E−05 | −3.6361E−07 | −1.4623E−07 | −6.7338E−12 |
| 8 | 0.8500 | −1.3123E−03 | −2.5904E−05 | −4.3500E−08 | 8.4532E−09 | 7.8565E−08 |
| 9 | −15.2000 | −1.7626E−03 | 2.6609E−04 | 1.1274E−05 | −4.4520E−06 | 5.3300E−07 |
| 13 | −0.8000 | −1.8397E−03 | −1.8759E−04 | 3.6065E−05 | −6.8841E−06 | 2.1781E−07 |
| 14 | −104.6270 | 1.5176E−03 | −2.8966E−04 | 4.5701E−05 | −7.5761E−06 | 3.1988E−07 |

Embodiment 4

Figure 4:
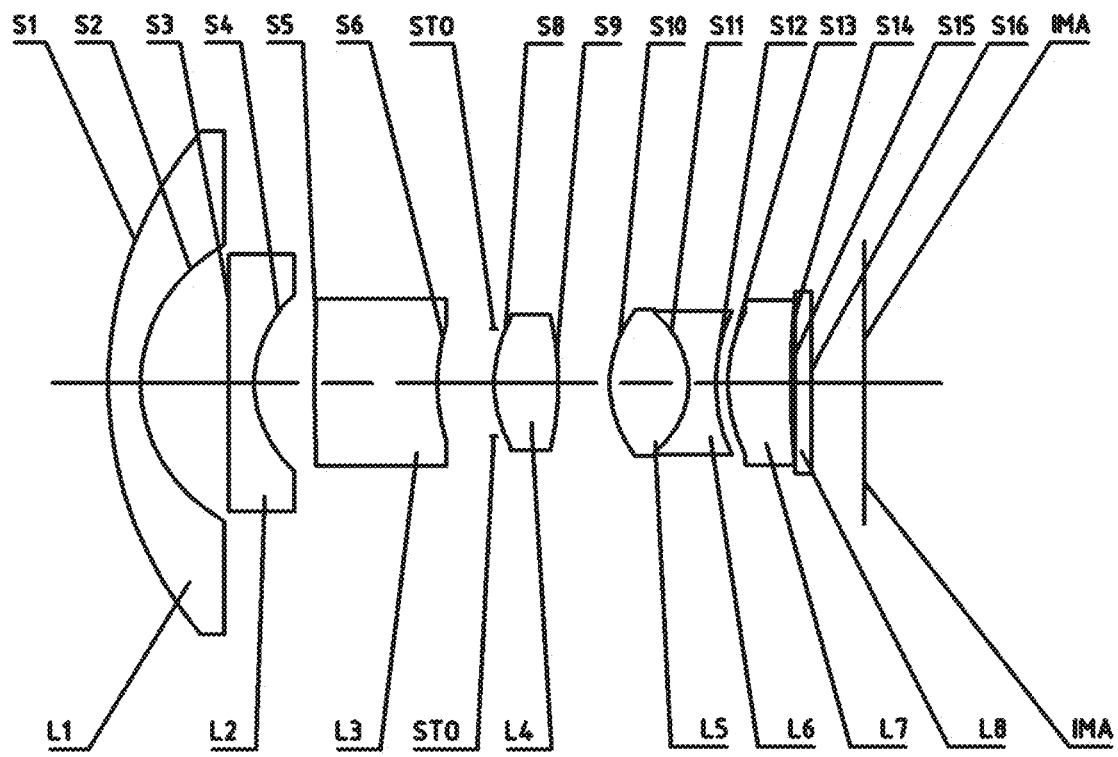
FIG. 4 illustrates a schematic structural diagram of an optical lens assembly according to Embodiment 4 of the present disclosure.

An optical lens assembly according to Embodiment 4 of the present disclosure is described below with reference to FIG. 4. In this Embodiment and the following Embodiments, the same description as in Embodiment 1 will be omitted for brevity. FIG. 4 illustrates a schematic structural diagram of the optical lens assembly according to Embodiment 4 of the present disclosure.

As shown in FIG. 4, the optical lens assembly, from an object side to an image side along an optical axis sequentially includes: a first lens L1, a second lens L2, a third lens L3, a fourth lens L4, a fifth lens L5, a sixth lens L6 and a seventh lens L7.

The first lens L1 is a meniscus lens having negative refractive power, an object-side surface S1 of the first lens is a convex surface, and an image-side surface S2 of the first lens is a concave surface.

The second lens L2 is a biconcave lens having negative refractive power, an object-side surface S3 and an image-side surface S4 of the second lens are both concave surfaces.

The third lens L3 is a meniscus lens having negative refractive power, an object-side surface S5 of the third lens is a convex surface, and an image-side surface S6 of the third lens is a concave surface.

The fourth lens L4 is a biconvex lens having positive refractive power, an object-side surface S8 and an image-side surface S9 of the fourth lens are both convex surfaces.

The fifth lens L5 is a biconvex lens having positive refractive power, an object-side surface S10 and an image-side surface S11 of the fifth lens are both convex surfaces.

The sixth lens L6 is a biconcave lens having negative refractive power, an object-side surface S11 and an image-side surface S12 of the sixth lens are both concave surfaces. The fifth lens L5 and the sixth lens L6 are cemented to form a cemented lens.

The seventh lens L7 is a biconvex lens having positive refractive power, an object-side surface S13 and an image-side surface S14 of the seventh lens are both convex surfaces.

The second lens L2, the fourth lens L4, and the seventh lens L7 are all aspheric lenses, and their respective object-side surfaces and image-side surfaces are all aspheric.

Alternatively, the optical lens assembly may further include an optical filter L8 having an object-side surface S15 and an image-side surface S16 and/or a cover lens L8'. The optical filter L8 may be used to correct color deviations. The cover lens L8' may be used to protect an image sensor chip located on an imaging plane IMA. Light from an object sequentially passes through the respective surfaces S1 to S16 and finally images on the imaging plane IMA.

In the optical lens assembly of the present embodiment, a stop STO may be disposed between the third lens L3 and the fourth lens L4 to improve imaging quality.

Table 7 shows the radius of curvature R, the thickness T, the refractive index Nd, and the abbe number Vd of each lens of the optical lens assembly of Embodiment 4. The unit of the radius of curvature R and the thickness T is millimeter (mm). Table 8 below shows the conic coefficient K and the high-order coefficients A, B, C, D and E applicable to aspheric surfaces S3-S4, S8-S9, and S13-S14 in Embodiment 4.

TABLE 7

| Surface number | Radius of curvature R | Thickness T | Refractive index Nd | Abbe number Vd |
|---|---|---|---|---|
| 1 | 14.4413 | 1.1000 | 1.77 | 49.61 |
| 2 | 5.7231 | 3.0000 | | |
| 3 | −49.9180 | 0.8800 | 1.80 | 46.52 |
| 4 | 5.8424 | 2.0500 | | |
| 5 | 87.5166 | 4.1853 | 1.49 | 70.40 |
| 6 | 7.0498 | 1.9300 | | |
| STO | Infinite | 0.0000 | | |
| 8 | 4.9288 | 2.2000 | 1.65 | 57.12 |
| 9 | −8.6502 | 1.7421 | | |
| 10 | 4.3401 | 2.6900 | 1.50 | 81.59 |
| 11 | −3.2979 | 0.9300 | 1.78 | 25.72 |
| 12 | 6.3244 | 0.4220 | | |

TABLE 7-continued

| Surface number | Radius of curvature R | Thickness T | Refractive index Nd | Abbe number Vd |
|---|---|---|---|---|
| 13 | 4.6640 | 2.1400 | 1.59 | 61.12 |
| 14 | −116.2839 | 0.1485 | | |
| 15 | Infinite | 0.5500 | 1.52 | 64.21 |
| 16 | Infinite | 1.8067 | | |
| IMA | Infinite | | | |

TABLE 8

| Surface number | K | A | B | C | D | E |
|---|---|---|---|---|---|---|
| 3 | 0.0000 | 9.9327E−04 | −2.7504E−05 | −2.0299E−07 | 3.4088E−08 | −7.4102E−10 |
| 4 | 0.0000 | 2.9010E−03 | 7.8710E−05 | 5.3675E−06 | 4.2541E−07 | −5.1850E−08 |
| 8 | 0.7895 | −1.1891E−03 | −9.8287E−05 | −1.5986E−06 | 6.3941E−06 | −1.0038E−06 |
| 9 | −21.9275 | −2.1363E−03 | 1.2106E−04 | 4.3521E−05 | −3.8662E−06 | 9.6645E−08 |
| 13 | −1.1322 | −2.2978E−03 | −2.3728E−04 | 4.2521E−05 | −4.6511E−06 | 3.1023E−07 |
| 14 | 399.4462 | 1.1471E−03 | −2.2635E−04 | 4.8893E−05 | −7.1878E−06 | 7.0346E−07 |

Embodiment 5

Figure 5:
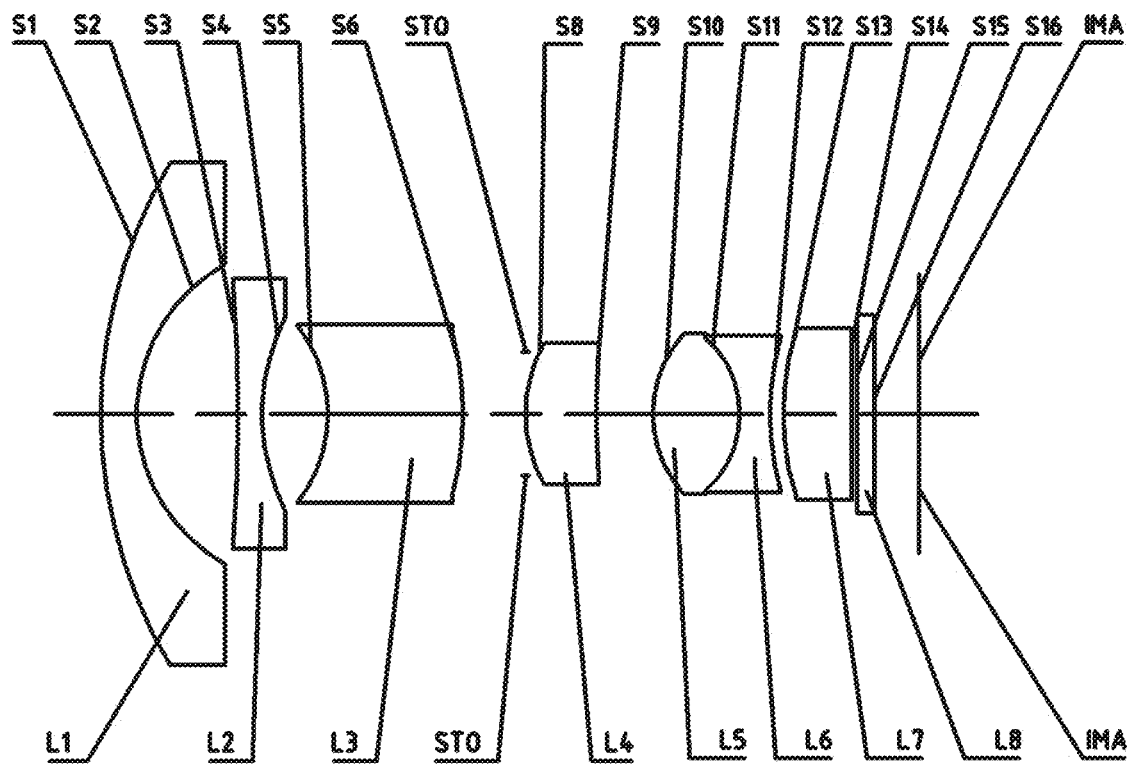
FIG. 5 illustrates a schematic structural diagram of an optical lens assembly according to Embodiment 5 of the present disclosure.

An optical lens assembly according to Embodiment 5 of the present disclosure is described below with reference to FIG. 5. In this Embodiment and the following Embodiments, the same description as in Embodiment 1 will be omitted for brevity. FIG. 5 illustrates a schematic structural diagram of the optical lens assembly according to Embodiment 5 of the present disclosure.

As shown in FIG. 5, the optical lens assembly, from an object side to an image side along an optical axis sequentially includes: a first lens L1, a second lens L2, a third lens L3, a fourth lens L4, a fifth lens L5, a sixth lens L6 and a seventh lens L7.

The first lens L1 is a meniscus lens having negative refractive power, an object-side surface S1 of the first lens is a convex surface, and an image-side surface S2 of the first lens is a concave surface.

The second lens L2 is a biconcave lens having negative refractive power, an object-side surface S3 and an image-side surface S4 of the second lens are both concave surfaces.

The third lens L3 is a meniscus lens having negative refractive power, an object-side surface S5 of the third lens is a concave surface, and an image-side surface S6 of the third lens is a convex surface.

The fourth lens L4 is a meniscus lens having positive refractive power, an object-side surface S8 of the fourth lens is a convex surface, and an image-side surface S9 of the fourth lens is a concave surface.

The fifth lens L5 is a biconvex lens having positive refractive power, an object-side surface S10 and an image-side surface S11 of the fifth lens are both convex surfaces. The sixth lens L6 is a biconcave lens having negative refractive power, an object-side surface S11 and an image-side surface S12 of the sixth lens are both concave surfaces. The fifth lens L5 and the sixth lens L6 are cemented to form a cemented lens.

The seventh lens L7 is a meniscus lens having positive refractive power, an object-side surface S13 of the seventh lens is a convex surface, and an image-side surface S14 of the seventh lens is a concave surface.

The second lens L2, the fourth lens L4, and the seventh lens L7 are all aspheric lenses, and their respective object-side surfaces and image-side surfaces are all aspheric.

Alternatively, the optical lens assembly may further include an optical filter L8 having an object-side surface S15 and an image-side surface S16 and/or a cover lens L8'. The optical filter L8 may be used to correct color deviations. The cover lens L8' may be used to protect an image sensor chip located on an imaging plane IMA. Light from an object sequentially passes through the respective surfaces S1 to S16 and is finally imaged on the imaging plane IMA.

In the optical lens assembly of the present Embodiment, a stop STO may be disposed between the third lens L3 and the fourth lens L4 to improve imaging quality.

Table 9 shows the radius of curvature R, the thickness T, the refractive index Nd, and the abbe number Vd of each lens of the optical lens assembly of Embodiment 5. The unit of the radius of curvature R and the thickness T is millimeter (mm). Table 10 below shows the conic coefficient K and the high-order coefficients A, B, C, D and E applicable to aspheric surfaces S3-S4, S8-S9, and S13-S14 in Embodiment 5.

TABLE 9

| Surface number | Radius of curvature R | Thickness T | Refractive index Nd | Abbe number Vd |
|---|---|---|---|---|
| 1 | 15.8191 | 1.1031 | 1.77 | 49.61 |
| 2 | 5.5074 | 3.0093 | | |
| 3 | −24.6144 | 0.8800 | 1.80 | 46.50 |
| 4 | 10.3563 | 2.0321 | | |
| 5 | −4.6888 | 4.1900 | 1.49 | 70.40 |
| 6 | −9.6465 | 1.9318 | | |
| STO | Infinite | 0.0000 | | |
| 8 | 4.6199 | 2.2000 | 1.66 | 57.12 |
| 9 | 219.7720 | 1.7421 | | |
| 10 | 3.9127 | 2.6900 | 1.50 | 81.59 |
| 11 | −3.3256 | 0.9300 | 1.78 | 25.72 |
| 12 | 8.9924 | 0.4220 | | |
| 13 | 5.0505 | 2.1367 | 1.59 | 61.12 |
| 14 | 50.3423 | 0.1485 | | |
| 15 | Infinite | 0.5500 | 1.52 | 64.21 |
| 16 | Infinite | 1.3626 | | |
| IMA | Infinite | | | |

TABLE 10

| Surface number | K | A | B | C | D | E |
|---|---|---|---|---|---|---|
| 3 | 0.0000 | 4.3121E−04 | 7.8304E−05 | −1.5910E−06 | −1.3654E−07 | 4.6563E−09 |
| 4 | 0.0000 | 9.7956E−04 | 3.9533E−04 | −5.7359E−05 | 8.1578E−06 | −4.7054E−07 |
| 8 | 0.5200 | −6.7345E−04 | −9.5485E−05 | 1.9714E−05 | −7.2467E−06 | 7.2102E−07 |
| 9 | −15.1851 | 3.5039E−03 | −1.1611E−03 | 4.3039E−04 | −7.5866E−05 | 5.3783E−06 |
| 13 | −0.7846 | −7.2571E−03 | 2.2424E−04 | −2.7178E−04 | 5.3272E−05 | −2.2572E−06 |
| 14 | −99.0000 | −5.8344E−04 | −2.6108E−03 | 6.8699E−04 | −9.3638E−05 | 6.2373E−06 |

Embodiment 6

Figure 6:
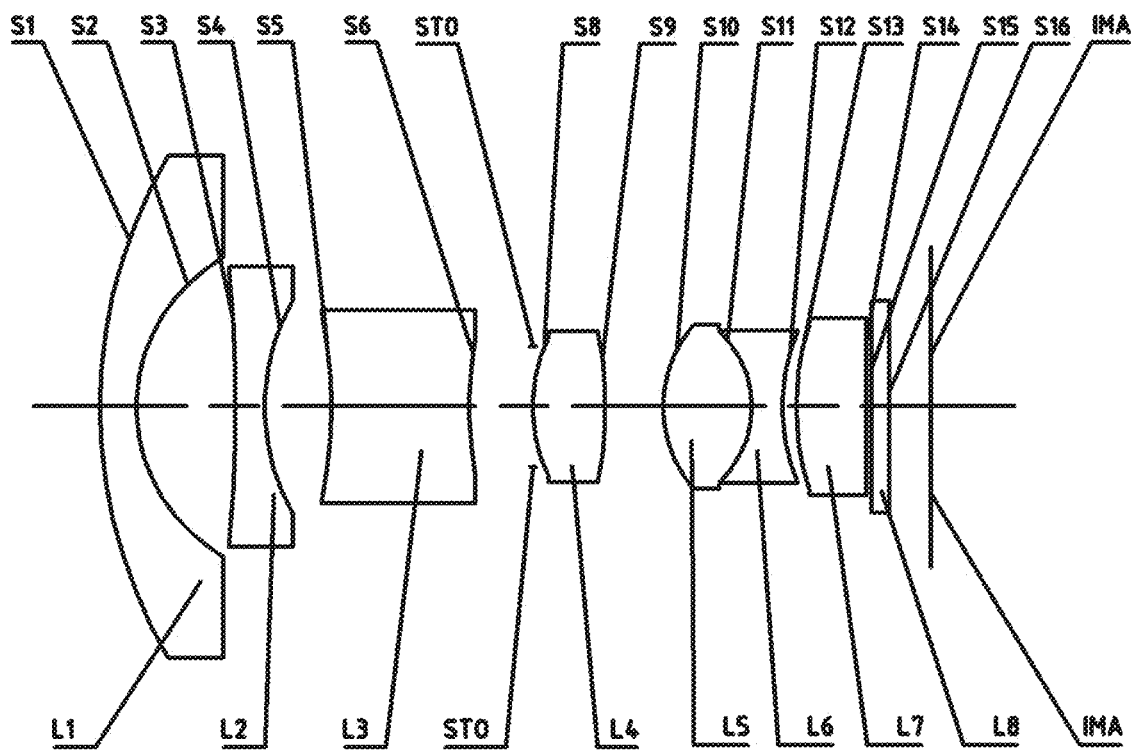
FIG. 6 illustrates a schematic structural diagram of an optical lens assembly according to Embodiment 6 of the present disclosure.

An optical lens assembly according to Embodiment 6 of the present disclosure is described below with reference to FIG. 6. In this Embodiment and the following Embodiments, the same description as in Embodiment 1 will be omitted for brevity. FIG. 6 illustrates a schematic structural diagram of the optical lens assembly according to Embodiment 6 of the present disclosure.

As shown in FIG. 6, the optical lens assembly, from an object side to an image side along an optical axis sequentially includes: a first lens L1, a second lens L2, a third lens L3, a fourth lens L4, a fifth lens L5, a sixth lens L6 and a seventh lens L7.

The first lens L1 is a meniscus lens having negative refractive power, an object-side surface S1 of the first lens is a convex surface, and an image-side surface S2 of the first lens is a concave surface.

The second lens L2 is a biconcave lens having negative refractive power, an object-side surface S3 and an image-side surface S4 of the second lens are both concave surfaces.

The third lens L3 is a biconcave lens having negative refractive power, an object-side surface S5 and an image-side surface S6 of the third lens are both concave surfaces.

The fourth lens L4 is a biconvex lens having positive refractive power, an object-side surface S8 and an image-side surface S9 of the fourth lens are both convex surfaces.

The fifth lens L5 is a biconvex lens having positive refractive power, an object-side surface S10 and an image-side surface S11 of the fifth lens are both convex surfaces. The sixth lens L6 is a biconcave lens having negative refractive power, an object-side surface S11 and an image-side surface S12 of the sixth lens are both concave surfaces. The fifth lens L5 and the sixth lens L6 are cemented to form a cemented lens.

The seventh lens L7 is a biconvex lens having positive refractive power, an object-side surface S13 and an image-side surface S14 of the seventh lens are both convex surfaces.

The second lens L2, the fourth lens L4, and the seventh lens L7 are all aspheric lenses, and their respective object-side surfaces and image-side surfaces are all aspheric.

Alternatively, the optical lens assembly may further include an optical filter L8 having an object-side surface S15 and an image-side surface S16 and/or a cover lens L8'. The optical filter L8 may be used to correct color deviations. The cover lens L8' may be used to protect an image sensor chip located on an imaging plane IMA. Light from an object sequentially passes through the respective surfaces S1 to S16 and finally images on the imaging plane IMA.

In the optical lens assembly of the present Embodiment, a stop STO may be disposed between the third lens L3 and the fourth lens L4 to improve imaging quality.

Table 11 shows the radius of curvature R, the thickness T, the refractive index Nd, and the abbe number Vd of each lens of the optical lens assembly of Embodiment 6. The unit of the radius of curvature R and the thickness T is millimeter (mm). Table 12 below shows the conic coefficient K and the high-order coefficients A, B, C, D and E applicable to aspheric surfaces S3-S4, S8-S9, and S13-S14 in Embodiment 6.

TABLE 11

| Surface number | Radius of curvature R | Thickness T | Refractive index Nd | Abbe number Vd |
|---|---|---|---|---|
| 1 | 15.7110 | 1.1031 | 1.77 | 49.61 |
| 2 | 5.4382 | 3.0093 | | |
| 3 | −21.2958 | 0.8800 | 1.80 | 46.50 |
| 4 | 11.2844 | 2.0321 | | |
| 5 | −14.4502 | 4.1800 | 1.49 | 70.40 |
| 6 | 12.6482 | 1.9318 | | |
| STO | Infinite | 0.0000 | | |
| 8 | 4.9233 | 2.2000 | 1.66 | 57.12 |
| 9 | −11.0655 | 1.7421 | | |
| 10 | 3.9534 | 2.7000 | 1.50 | 81.59 |
| 11 | −3.3298 | 0.9312 | 1.78 | 25.72 |
| 12 | 6.4453 | 0.4220 | | |
| 13 | 4.8322 | 2.1367 | 1.59 | 61.12 |
| 14 | −2380.8640 | 0.1485 | | |
| 15 | Infinite | 0.5500 | 1.52 | 64.21 |
| 16 | Infinite | 1.2434 | | |
| IMA | Infinite | | | |

TABLE 12

| Surface number | K | A | B | C | D | E |
|---|---|---|---|---|---|---|
| 3 | 0.0000 | 7.7832E−04 | 3.1037E−06 | 2.1381E−07 | −4.8101E−08 | 6.3656E−10 |
| 4 | 0.0000 | 1.9849E−03 | 9.9263E−05 | −5.6164E−06 | 1.6038E−06 | −1.1314E−07 |
| 8 | 0.5000 | −1.4855E−03 | −1.5363E−04 | 7.6941E−06 | −1.2846E−06 | −5.4682E−08 |
| 9 | −15.2000 | 5.1384E−04 | −5.7731E−04 | 1.5970E−04 | −2.1206E−05 | 9.7375E−07 |
| 13 | −0.8000 | −6.4087E−03 | 6.0596E−05 | −1.6500E−04 | 1.9082E−05 | 4.5511E−07 |
| 14 | −100.0000 | 2.0869E−04 | −1.2453E−03 | 2.8376E−04 | −4.5568E−05 | 3.8725E−06 |

Embodiment 7

Figure 7:
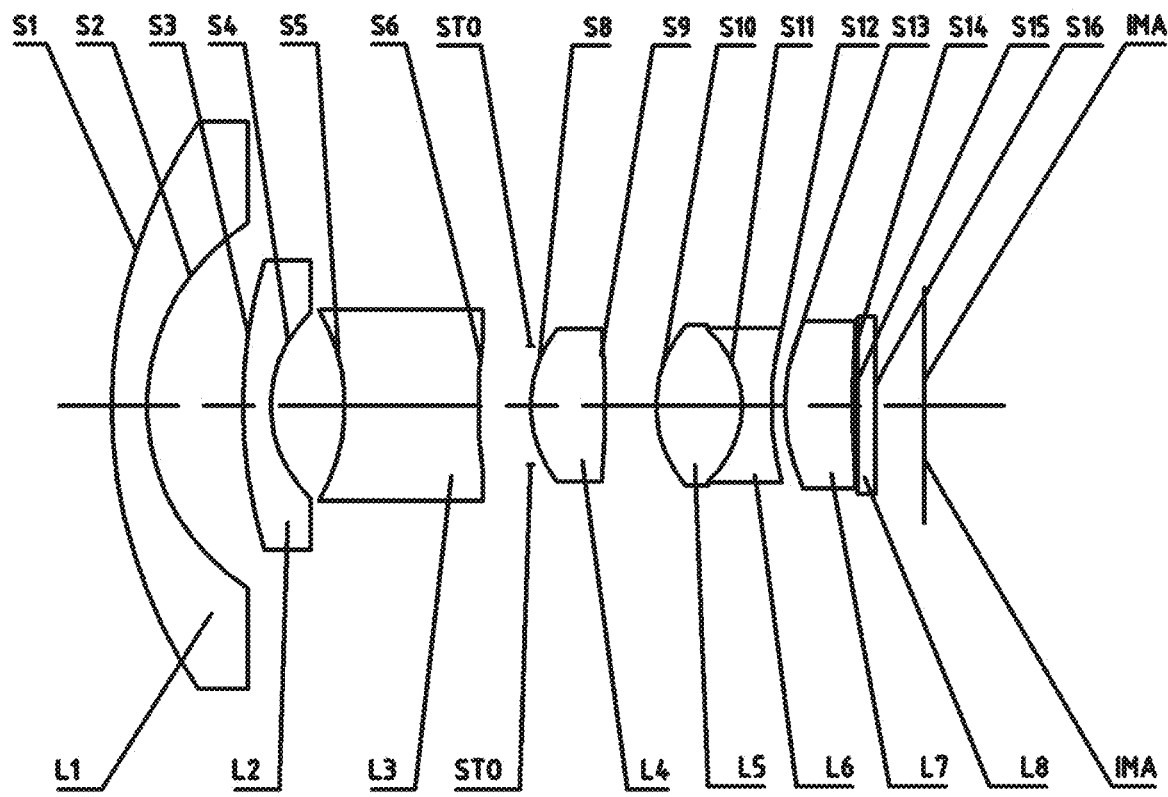
FIG. 7 illustrates a schematic structural diagram of an optical lens assembly according to Embodiment 7 of the present disclosure.

An optical lens assembly according to Embodiment 7 of the present disclosure is described below with reference to FIG. 7. In this Embodiment and the following Embodiments, the same description as in Embodiment 1 will be omitted for brevity. FIG. 7 illustrates a schematic structural diagram of the optical lens assembly according to Embodiment 7 of the present disclosure.

As shown in FIG. 7, the optical lens assembly, from an object side to an image side along an optical axis sequentially includes: a first lens L1, a second lens L2, a third lens L3, a fourth lens L4, a fifth lens L5, a sixth lens L6 and a seventh lens L7.

The first lens L1 is a meniscus lens having negative refractive power, an object-side surface S1 of the first lens is a convex surface, and an image-side surface S2 of the first lens is a concave surface.

The second lens L2 is a meniscus lens having negative refractive power, an object-side surface S3 of the second lens is a convex surface, and an image-side surface S4 of the second lens is a concave surface.

The third lens L3 is a biconcave lens having negative refractive power, an object-side surface S5 and an image-side surface S6 of the third lens are both concave surfaces.

The fourth lens L4 is a biconvex lens having positive refractive power, an object-side surface S8 and an image-side surface S9 of the fourth lens are both convex surfaces.

The fifth lens L5 is a biconvex lens having positive refractive power, an object-side surface S10 and an image-side surface S11 of the fifth lens are both convex surfaces. The sixth lens L6 is a biconcave lens having negative refractive power, an object-side surface S11 and an image-side surface S12 of the sixth lens are both concave surfaces. The fifth lens L5 and the sixth lens L6 are cemented to form a cemented lens.

The seventh lens L7 is a meniscus lens having positive refractive power, an object-side surface S13 of the seventh lens is a convex surface, and an image-side surface S14 of the seventh lens is a concave surface.

The second lens L2, the fourth lens L4, and the seventh lens L7 are all aspheric lenses, and their respective object-side surfaces and image-side surfaces are all aspheric.

Alternatively, the optical lens assembly may further include an optical filter L8 having an object-side surface S15 and an image-side surface S16 and/or a cover lens L8'. The optical filter L8 may be used to correct color deviations. The cover lens L8' may be used to protect an image sensor chip located on an imaging plane IMA. Light from an object sequentially passes through the respective surfaces S1 to S16 and is finally imaged on the imaging plane IMA.

In the optical lens assembly of the present Embodiment, a stop STO may be disposed between the third lens L3 and the fourth lens L4 to improve imaging quality.

Table 13 shows the radius of curvature R, the thickness T, the refractive index Nd, and the abbe number Vd of each lens of the optical lens assembly of Embodiment 7. The unit of the radius of curvature R and the thickness T is millimeter (mm). Table 14 below shows the conic coefficient K and the high-order coefficients A, B, C, D and E applicable to aspheric surfaces S3-S4, S8-S9, and S13-S14 in Embodiment 7.

TABLE 13

| Surface number | Radius of curvature R | Thickness T | Refractive index Nd | Abbe number Vd |
|---|---|---|---|---|
| 1 | 16.2825 | 1.1031 | 1.77 | 49.61 |
| 2 | 6.9074 | 3.0093 | | |
| 3 | 25.2624 | 0.8800 | 1.80 | 46.50 |
| 4 | 5.1947 | 2.0321 | | |
| 5 | −6.0121 | 4.1900 | 1.49 | 70.40 |
| 6 | 17.5402 | 1.9318 | | |
| STO | Infinite | 0.0000 | | |
| 8 | 4.1991 | 2.2000 | 1.66 | 57.12 |
| 9 | −22.8850 | 1.7421 | | |
| 10 | 4.0020 | 2.6900 | 1.50 | 81.59 |
| 11 | −3.3099 | 0.9300 | 1.78 | 25.72 |
| 12 | 9.5217 | 0.4220 | | |
| 13 | 4.6336 | 2.1400 | 1.57 | 61.12 |
| 14 | 50.0042 | 0.1485 | | |
| 15 | Infinite | 0.5500 | 1.52 | 64.21 |
| 16 | Infinite | 1.5325 | | |
| IMA | Infinite | | | |

TABLE 14

| Surface number | K | A | B | C | D | E |
|---|---|---|---|---|---|---|
| 3 | 0.2500 | −3.7544E−04 | 7.4865E−05 | −5.6577E−07 | −9.2265E−08 | 2.3834E−09 |
| 4 | −0.2580 | 9.6181E−05 | 5.3865E−04 | −6.5866E−05 | 8.2336E−06 | −1.9241E−07 |
| 8 | 0.8013 | −1.0882E−03 | −1.5884E−04 | 3.0252E−05 | −2.5802E−06 | −3.7584E−08 |
| 9 | −15.1851 | 4.7420E−03 | −1.2134E−03 | 4.8239E−04 | −7.4021E−05 | 5.4981E−06 |
| 13 | −0.7846 | −6.3089E−03 | 7.5004E−04 | −2.7717E−04 | 4.1385E−05 | −1.5034E−06 |
| 14 | −100.0000 | 1.1486E−03 | −2.1693E−03 | 6.1608E−04 | −8.4440E−05 | 5.2753E−06 |

Embodiment 8

Figure 8:
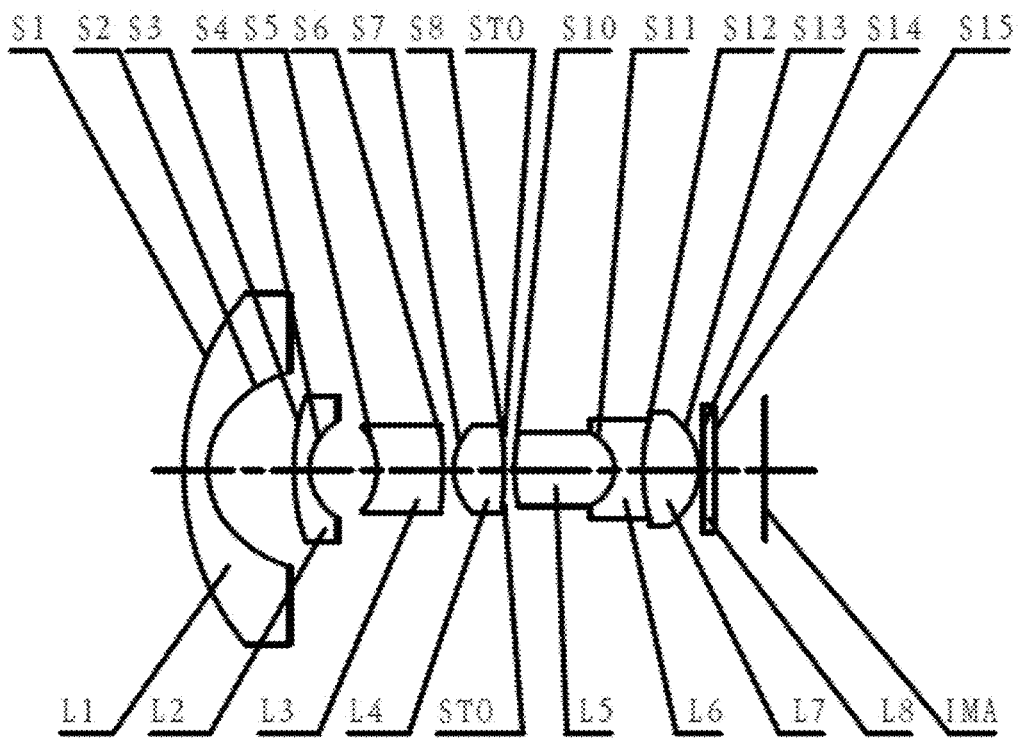
FIG. 8 illustrates a schematic structural diagram of an optical lens assembly according to Embodiment 8 of the present disclosure.

An optical lens assembly according to Embodiment 8 of the present disclosure is described below with reference to FIG. 8. FIG. 8 illustrates a schematic structural diagram of the optical lens assembly according to Embodiment 8 of the present disclosure.

As shown in FIG. 8, the optical lens assembly, from an object side to an image side along an optical axis sequentially includes: a first lens L1, a second lens L2, a third lens L3, a fourth lens L4, a fifth lens L5, a sixth lens L6 and a seventh lens L7.

The first lens L1 is a meniscus lens having negative refractive power, an object-side surface S1 of the first lens is a convex surface, and an image-side surface S2 of the first lens is a concave surface. The second lens L2 is a meniscus lens having negative refractive power, an object-side surface S3 of the second lens is a convex surface, and an image-side surface S4 of the second lens is a concave surface. The third lens L3 is a meniscus lens having negative refractive power, an object-side surface S5 of the third lens is a concave surface, and an image-side surface S6 of the third lens is a convex surface. The fourth lens L4 is a biconvex lens having positive refractive power, an object-side surface S7 of the fourth lens is a convex surface, and an image-side surface S8 of the fourth lens is a convex surface. The fifth lens L5 is a biconvex lens having positive refractive power, an object-side surface S10 of the fifth lens is a convex surface, and an image-side surface S11 of the fifth lens is a convex surface. The sixth lens L6 is a biconcave lens having negative refractive power, an object-side surface S11 of the sixth lens is a concave surface, and an image-side surface S12 of the sixth lens is a concave surface. The seventh lens L7 is a biconvex lens having positive refractive power, an object-side surface S12 of the seventh lens is a convex surface, and an image-side surface S13 of the seventh lens is a convex surface. The fifth lens L5, the sixth lens L6, and the seventh lens L7 may be cemented to form a cemented lens.

The optical lens assembly may further include a stop STO, and the stop STO may be disposed between the fourth lens L4 and the fifth lens L5 to improve imaging quality. For example, the stop STO may be arranged close to the image-side surface S8 of the fourth lens L4.

In this Embodiment, the object-side surfaces and the image-side surfaces of the second lens L2, the third lens L3, and the fourth lens L4 may be aspheric. In addition, the image-side surface S13 of the seventh lens L7 may be aspheric.

Alternatively, the optical lens assembly may further include an optical filter L8 having an object-side surface S14 and an image-side surface S15 and/or a cover lens L8'. The optical filter L8 may be used to correct color deviations. The cover lens L8' may be used to protect an image sensor chip located on an imaging plane IMA. Light from an object sequentially passes through the respective surfaces S1 to S15 and finally images on the imaging plane IMA.

Table 15 shows the radius of curvature R, the thickness T (it should be understood that the thickness T of S1 is the center thickness of the first lens L1, and the thickness T of S2 is the air interval between the first lens L1 and the second lens L2, and so on), the refractive index Nd, and the abbe number Vd of each lens of the optical lens assembly of Embodiment 8.

TABLE 15

| Surface number | Radius of curvature R (mm) | Thickness T (mm) | Refractive index Nd | Abbe number Vd |
|---|---|---|---|---|
| S1 | 17.3012 | 1.1000 | 1.75 | 48.61 |
| S2 | 5.5571 | 3.9210 | | |
| S3 | 16.2038 | 0.7000 | 1.69 | 54.57 |
| S4 | 3.1643 | 3.0689 | | |
| S5 | −4.6510 | 3.0000 | 1.59 | 61.25 |
| S6 | −51.0328 | 0.4902 | | |
| S7 | 3.6542 | 2.3000 | 1.62 | 62.40 |
| S8 | −8.1161 | 0.0181 | | |
| STO | Infinite | 0.4532 | | |
| S10 | 10.4524 | 4.5500 | 1.48 | 81.61 |
| S11 | −2.3471 | 1.3000 | 1.77 | 25.72 |
| S12 | 11.8268 | 2.5500 | 1.59 | 61.25 |
| S13 | −3.0049 | 0.1481 | | |

TABLE 15-continued

| Surface number | Radius of curvature R (mm) | Thickness T (mm) | Refractive index Nd | Abbe number Vd |
|---|---|---|---|---|
| S14 | Infinite | 0.5500 | 1.52 | 64.21 |
| S15 | Infinite | 2.3026 | | |
| IMA | Infinite | | | |

The present Embodiment employs seven lenses as an example. The lens assembly may have at least one beneficial effect, such as a high resolution, miniaturization, a small front-end diameter, a small CRA, a good temperature performance, a huge field-of-view, telephoto and the like, by rationally configuring the refractive power, the surface shape, the center thickness of each lens, and the air interval between the lenses.

Table 16 below shows the conic coefficient K and the high-order coefficients A, B, C, D and E applicable to aspheric surfaces in Embodiment 8. The definition of the surface number in Table 16 is the same as that in Table 15.

TABLE 16

| Surface number | K | A | B | C | D | E |
|---|---|---|---|---|---|---|
| S3 | −3.5900 | 6.6431E−05 | 2.1065E−05 | −4.3814E−07 | 2.9650E−08 | −1.2620E−16 |
| S4 | −0.0157 | −3.4647E−03 | 2.6331E−04 | −3.1710E−05 | 1.3612E−06 | 6.7778E−15 |
| S5 | −6.0549 | −8.6008E−03 | 5.7788E−04 | −1.4678E−04 | 7.7548E−06 | −2.1680E−07 |
| S6 | 250.0000 | −2.2493E−04 | −2.6720E−04 | 1.4903E−05 | −1.3722E−06 | 5.4544E−08 |
| S7 | −0.6000 | 2.7355E−04 | 2.1389E−04 | 6.7499E−06 | 3.9094E−06 | 2.2278E−07 |
| S8 | −18.2300 | 9.5319E−04 | 9.1063E−04 | −6.2378E−05 | 1.5313E−05 | 1.7817E−05 |
| S13 | −2.5500 | −1.2507E−03 | −1.9799E−04 | 4.8521E−05 | −6.1144E−06 | 2.6256E−07 |

Embodiment 9

Figure 9:
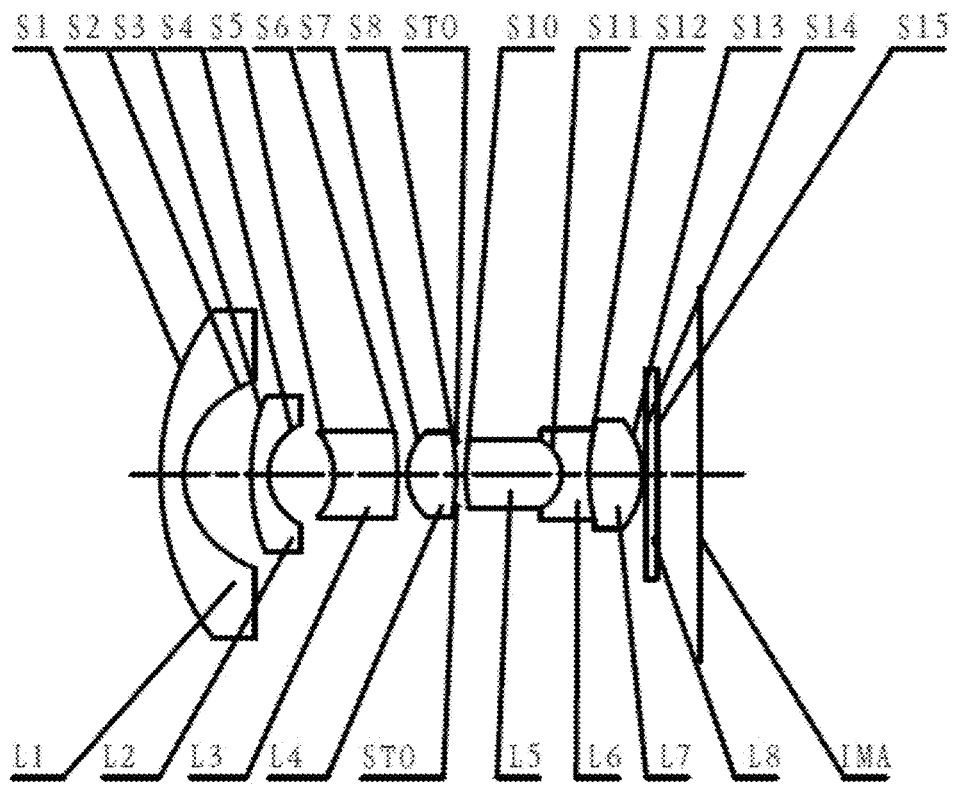
FIG. 9 illustrates a schematic structural diagram of an optical lens assembly according to Embodiment 9 of the present disclosure.

An optical lens assembly according to Embodiment 9 of the present disclosure is described below with reference to FIG. 9. FIG. 9 illustrates a schematic structural diagram of the optical lens assembly according to Embodiment 9 of the present disclosure.

As shown in FIG. 9, the optical lens assembly, from an object side to an image side along an optical axis sequentially includes: a first lens L1, a second lens L2, a third lens L3, a fourth lens L4, a fifth lens L5, a sixth lens L6 and a seventh lens L7.

The first lens L1 is a meniscus lens having negative refractive power, an object-side surface S1 of the first lens is a convex surface, and an image-side surface S2 of the first lens is a concave surface. The second lens L2 is a meniscus lens having negative refractive power, an object-side surface S3 of the second lens is a convex surface, and an image-side surface S4 of the second lens is a concave surface. The third lens L3 is a meniscus lens having negative refractive power, an object-side surface S5 of the third lens is a concave surface, and an image-side surface S6 of the third lens is a convex surface. The fourth lens L4 is a biconvex lens having positive refractive power, an object-side surface S7 of the fourth lens is a convex surface, and an image-side surface S8 of the fourth lens is a convex surface. The fifth lens L5 is a biconvex lens having positive refractive power, an object-side surface S10 of the fifth lens is a convex surface, and an image-side surface S11 of the fifth lens is a convex surface. The sixth lens L6 is a biconcave lens having negative refractive power, an object-side surface S11 of the sixth lens is a concave surface, and an image-side surface S12 of the sixth lens is a concave surface. The seventh lens L7 is a biconvex lens having positive refractive power, an object-side surface S12 of the seventh lens is a convex surface, and an image-side surface S13 of the seventh lens is a convex surface. The fifth lens L5, the sixth lens L6, and the seventh lens L7 may be cemented to form a cemented lens.

The optical lens assembly may further include a stop STO, and the stop STO may be disposed between the fourth lens L4 and the fifth lens L5 to improve imaging quality. For example, the stop STO may be arranged close to the image-side surface S8 of the fourth lens L4.

In this Embodiment, the object-side surfaces and the image-side surfaces of the second lens L2, the third lens L3, and the fourth lens L4 may be aspheric. In addition, the image-side surface S13 of the seventh lens L7 may be aspheric.

Alternatively, the optical lens assembly may further include an optical filter L8 having an object-side surface S14 and an image-side surface S15 and/or a cover lens L8'. The optical filter L8 may be used to correct color deviations. The cover lens L8' may be used to protect an image sensor chip located on an imaging plane IMA. Light from an object sequentially passes through the respective surfaces S1 to S15 and finally images on the imaging plane IMA.

Table 17 shows the radius of curvature R, the thickness T, the refractive index Nd, and the abbe number Vd of each lens of the optical lens assembly of Embodiment 9. Table 18 below shows the conic coefficient K and the high-order coefficients A, B, C, D and E applicable to aspheric surfaces in Embodiment 9. The definition of the surface number in Table 18 is the same as that in Table 17.

TABLE 17

| Surface number | Radius of curvature R (mm) | Thickness T (mm) | Refractive index Nd | Abbe number Vd |
|---|---|---|---|---|
| S1 | 17.7265 | 1.1000 | 1.76 | 49.60 |
| S2 | 5.7077 | 3.1997 | | |
| S3 | 15.8137 | 0.8200 | 1.70 | 54.57 |
| S4 | 3.1668 | 3.0755 | | |
| S5 | −4.6535 | 3.0000 | 1.59 | 62.25 |
| S6 | −50.8287 | 0.4902 | | |
| S7 | 3.6532 | 2.3000 | 1.62 | 63.41 |
| S8 | −8.0919 | 0.0181 | | |
| STO | Infinite | 0.4594 | | |
| S10 | 10.4424 | 4.5500 | 1.51 | 81.59 |
| S11 | −2.3503 | 1.3000 | 1.78 | 25.72 |
| S12 | 12.3138 | 2.5000 | 1.59 | 61.25 |
| S13 | −3.0649 | 0.1481 | | |
| S14 | Infinite | 0.5500 | 1.52 | 64.21 |
| S15 | Infinite | 2.0662 | | |
| IMA | Infinite | | | |

TABLE 18

| Surface number | K | A | B | C | D | E |
|---|---|---|---|---|---|---|
| S3 | −3.1070 | 8.5434E−05 | 2.2651E−05 | −4.3677E−07 | 2.6059E−10 | −2.2678E−11 |
| S4 | −0.0065 | −3.2602E−03 | 2.5001E−04 | −3.2921E−05 | 1.4972E−06 | 3.2952E−08 |
| S5 | −5.9622 | −8.6137E−03 | 5.8817E−04 | −1.4404E−04 | 6.1391E−06 | −2.1499E−07 |
| S6 | 270.0000 | −2.3989E−04 | −2.6702E−04 | 1.4565E−05 | −1.4971E−06 | 3.5398E−08 |
| S7 | −0.5416 | 2.8151E−04 | 2.1042E−04 | 5.1514E−06 | 3.1967E−06 | 1.2266E−07 |
| S8 | −18.4000 | 9.7040E−04 | 9.1410E−04 | −6.3571E−05 | 1.3067E−05 | 1.1287E−06 |
| S13 | −2.5500 | −1.1704E−03 | −1.8739E−04 | 4.9203E−05 | −6.1238E−07 | 2.5049E−07 |

Embodiment 10

Figure 10:
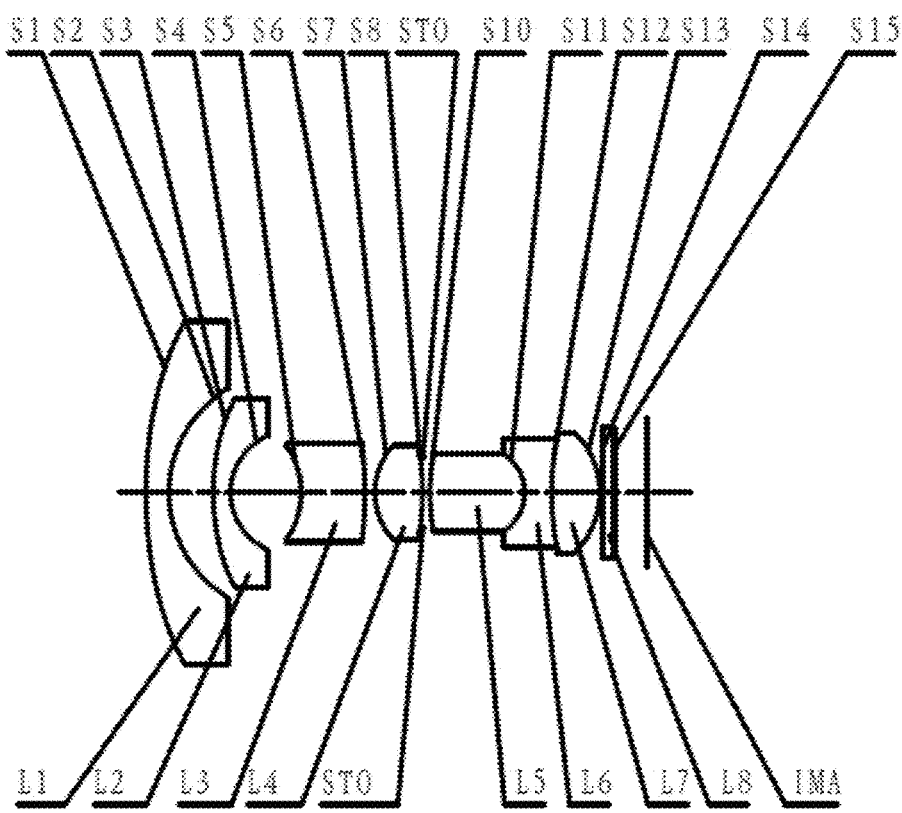
FIG. 10 illustrates a schematic structural diagram of an optical lens assembly according to Embodiment 10 of the present disclosure.

An optical lens assembly according to Embodiment 10 of the present disclosure is described below with reference to FIG. 10. FIG. 10 illustrates a schematic structural diagram of the optical lens assembly according to Embodiment 10 of the present disclosure.

As shown in FIG. 10, the optical lens assembly, from an object side to an image side along an optical axis sequentially includes: a first lens L1, a second lens L2, a third lens L3, a fourth lens L4, a fifth lens L5, a sixth lens L6 and a seventh lens L7.

The first lens L1 is a meniscus lens having negative refractive power, an object-side surface S1 of the first lens is a convex surface, and an image-side surface S2 of the first lens is a concave surface. The second lens L2 is a meniscus lens having negative refractive power, an object-side surface S3 of the second lens is a convex surface, and an image-side surface S4 of the second lens is a concave surface. The third lens L3 is a meniscus lens having negative refractive power, an object-side surface S5 of the third lens is a concave surface, and an image-side surface S6 of the third lens is a convex surface. The fourth lens L4 is a biconvex lens having positive refractive power, an object-side surface S7 of the fourth lens is a convex surface, and an image-side surface S8 of the fourth lens is a convex surface. The fifth lens L5 is a biconvex lens having positive refractive power, an object-side surface S10 of the fifth lens is a convex surface, and an image-side surface S11 of the fifth lens is a convex surface. The sixth lens L6 is a biconcave lens having negative refractive power, an object-side surface S11 of the sixth lens is a concave surface, and an image-side surface S12 of the sixth lens is a concave surface. The seventh lens L7 is a biconvex lens having positive refractive power, an object-side surface S12 of the seventh lens is a convex surface, and an image-side surface S13 of the seventh lens is a convex surface. The fifth lens L5, the sixth lens L6, and the seventh lens L7 may be cemented to form a cemented lens.

The optical lens assembly may further include a stop STO, and the stop STO may be disposed between the fourth lens L4 and the fifth lens L5 to improve imaging quality. For example, the stop STO may be arranged close to the image-side surface S8 of the fourth lens L4.

In this Embodiment, the object-side surfaces and the image-side surfaces of the second lens L2, the third lens L3, and the fourth lens L4 may be aspheric. In addition, the image-side surface S13 of the seventh lens L7 may be aspheric.

Alternatively, the optical lens assembly may further include an optical filter L8 having an object-side surface S14 and an image-side surface S15 and/or a cover lens L8'. The optical filter L8 may be used to correct color deviations. The cover lens L8' may be used to protect an image sensor chip located on an imaging plane IMA. Light from an object sequentially passes through the respective surfaces S1 to S15 and is finally imaged on the imaging plane IMA.

Table 19 shows the radius of curvature R, the thickness T, the refractive index Nd, and the abbe number Vd of each lens of the optical lens assembly of Embodiment 10. Table 20 below shows the conic coefficient K and the high-order coefficients A, B, C, D and E applicable to aspheric surfaces in Embodiment 10. The definition of the surface number in Table 20 is the same as that in Table 19.

TABLE 19

| Surface number | Radius of curvature R (mm) | Thickness T (mm) | Refractive index Nd | Abbe number Vd |
|---|---|---|---|---|
| S1 | 21.4684 | 1.1673 | 1.76 | 48.61 |
| S2 | 6.5161 | 2.2482 | | |
| S3 | 15.9903 | 0.8702 | 1.70 | 54.57 |
| S4 | 3.3580 | 3.5640 | | |
| S5 | −4.9308 | 3.2048 | 1.59 | 62.25 |
| S6 | −53.0098 | 0.5202 | | |
| S7 | 3.8801 | 2.4089 | 1.62 | 63.40 |
| S8 | −8.5281 | 0.0192 | | |
| STO | Infinite | 0.3608 | | |
| S10 | 11.0153 | 4.7965 | 1.50 | 80.59 |
| S11 | −2.5048 | 1.3795 | 1.78 | 25.72 |
| S12 | 16.0797 | 2.3877 | 1.59 | 61.25 |
| S13 | −3.5635 | 0.1572 | | |
| S14 | Infinite | 0.5836 | 1.52 | 64.20 |
| S15 | Infinite | 1.6875 | | |
| IMA | Infinite | | | |

TABLE 20

| Surface number | K | A | B | C | D | E |
|---|---|---|---|---|---|---|
| S3 | −3.0337 | 1.0689E−04 | 2.5191E−05 | −3.2645E−07 | 1.1082E−08 | −1.4428E−10 |
| S4 | 0.1337 | −2.3111E−03 | 1.6814E−04 | −2.4272E−05 | 6.3101E−07 | 7.4858E−08 |
| S5 | −6.1784 | −7.1566E−03 | 4.5346E−04 | −9.0488E−05 | 5.1712E−06 | −2.1337E−07 |
| S6 | 272.0893 | −2.9411E−04 | −2.0431E−04 | 7.3551E−06 | −9.9158E−07 | 1.1380E−07 |
| S7 | −0.2000 | 2.7255E−04 | 1.3935E−04 | −3.3557E−07 | 1.8326E−06 | 1.7255E−07 |
| S8 | −18.6312 | 8.2909E−04 | 6.7683E−04 | −4.4649E−05 | 7.4132E−06 | 4.5910E−07 |
| S13 | −2.5942 | −9.8576E−04 | −1.4387E−04 | 3.2436E−05 | −3.5451E−06 | 1.3444E−07 |

Embodiment 11

Figure 11:
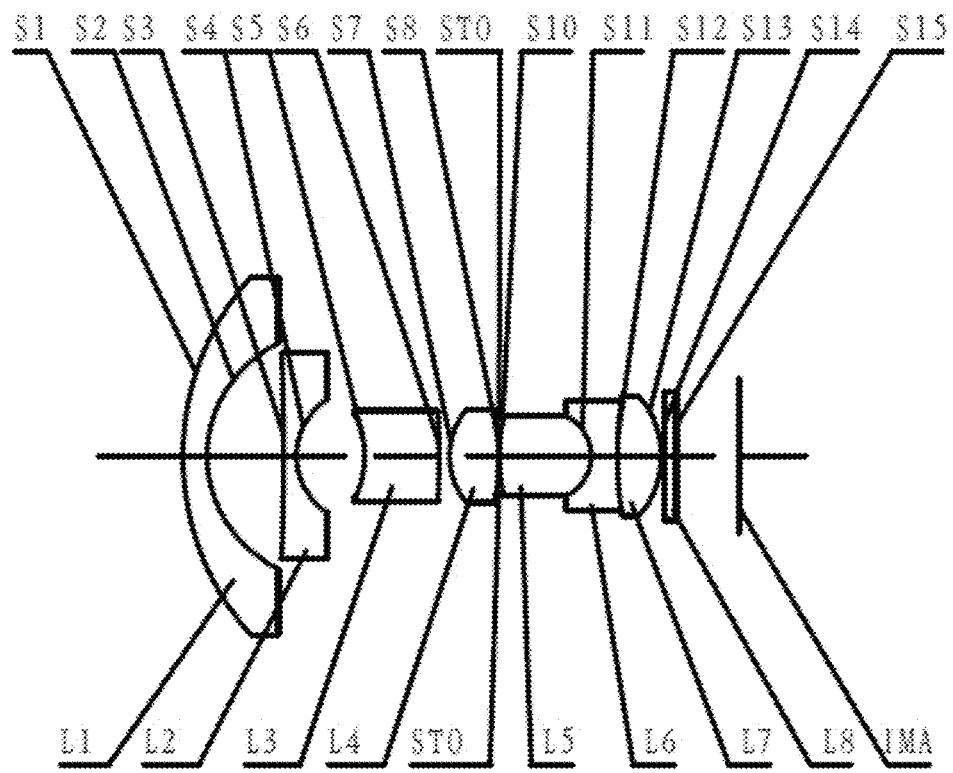
FIG. 11 illustrates a schematic structural diagram of an optical lens assembly according to Embodiment 11 of the present disclosure.

An optical lens assembly according to Embodiment 11 of the present disclosure is described below with reference to FIG. 11. FIG. 11 illustrates a schematic structural diagram of the optical lens assembly according to Embodiment 11 of the present disclosure.

As shown in FIG. 11, the optical lens assembly, from an object side to an image side along an optical axis sequentially includes: a first lens L1, a second lens L2, a third lens L3, a fourth lens L4, a fifth lens L5, a sixth lens L6 and a seventh lens L7.

The first lens L1 is a meniscus lens having negative refractive power, an object-side surface S1 of the first lens is a convex surface, and an image-side surface S2 of the first lens is a concave surface. The second lens L2 is a biconcave lens having negative refractive power, an object-side surface S3 of the second lens is a concave surface, and an image-side surface S4 of the second lens is a concave surface. The third lens L3 is a meniscus lens having negative refractive power, an object-side surface S5 of the third lens is a concave surface, and an image-side surface S6 of the third lens is a convex surface. The fourth lens L4 is a biconvex lens having positive refractive power, an object-side surface S7 of the fourth lens is a convex surface, and an image-side surface S8 of the fourth lens is a convex surface. The fifth lens L5 is a biconvex lens having positive refractive power, an object-side surface S10 of the fifth lens is a convex surface, and an image-side surface S11 of the fifth lens is a convex surface. The sixth lens L6 is a biconvex lens having negative refractive power, an object-side surface S11 of the sixth lens is a concave surface, and an image-side surface S12 of the sixth lens is a concave surface. The seventh lens L7 is a biconvex lens having positive refractive power, an object-side surface S12 of the seventh lens is a convex surface, and an image-side surface S13 of the seventh lens is a convex surface. The fifth lens L5, the sixth lens L6, and the seventh lens L7 may be cemented to form a cemented lens.

The optical lens assembly may further include a stop STO, and the stop STO may be disposed between the fourth lens L4 and the fifth lens L5 to improve imaging quality. For example, the stop STO may be arranged close to the image-side surface S8 of the fourth lens L4.

In this Embodiment, the object-side surfaces and the image-side surfaces of the second lens L2, the third lens L3, and the fourth lens L4 may be aspheric. In addition, the image-side surface S13 of the seventh lens L7 may be aspheric.

Alternatively, the optical lens assembly may further include an optical filter L8 having an object-side surface S14 and an image-side surface S15 and/or a cover lens L8'. The optical filter L8 may be used to correct color deviations. The cover lens L8' may be used to protect an image sensor chip located on an imaging plane IMA. Light from an object sequentially passes through the respective surfaces S1 to S15 and is finally imaged on the imaging plane IMA.

Table 21 shows the radius of curvature R, the thickness T, the refractive index Nd, and the abbe number Vd of each lens of the optical lens assembly of Embodiment 11. Table 22 below shows the conic coefficient K and the high-order coefficients A, B, C, D and E applicable to aspheric surfaces in Embodiment 11. The definition of the surface number in Table 22 is the same as that in Table 21.

TABLE 21

| Surface number | Radius of curvature R (mm) | Thickness T (mm) | Refractive index Nd | Abbe number Vd |
|---|---|---|---|---|
| S1 | 13.5595 | 1.1000 | 1.77 | 49.61 |
| S2 | 6.2054 | 3.1283 | | |
| S3 | −20.1247 | 0.9600 | 1.68 | 55.57 |
| S4 | 4.1484 | 3.1156 | | |
| S5 | −5.6207 | 3.4000 | 1.59 | 61.25 |
| S6 | −72.2948 | 0.4902 | | |
| S7 | 3.7390 | 2.2400 | 1.62 | 63.41 |
| S8 | −8.4998 | 0.0181 | | |
| STO | Infinite | 0.0194 | | |
| S10 | 9.0953 | 4.2000 | 1.50 | 81.59 |
| S11 | −2.2000 | 1.2000 | 1.79 | 25.75 |
| S12 | 18.0657 | 2.0000 | 1.59 | 61.25 |
| S13 | −3.7410 | 0.1481 | | |
| S14 | Infinite | 0.5500 | 1.52 | 64.21 |
| S15 | Infinite | 2.8746 | | |
| IMA | Infinite | | | |

TABLE 22

| Surface number | K | A | B | C | D | E |
|---|---|---|---|---|---|---|
| S3 | −180.5696 | 1.0930E−03 | 3.1167E−06 | −9.2821E−07 | 2.5874E−08 | −2.6493E−10 |
| S4 | 0.9775 | 7.3044E−04 | −1.3386E−04 | 5.3449E−05 | −8.6217E−06 | 7.7612E−07 |
| S5 | −7.4070 | −8.2662E−03 | 6.9968E−04 | −9.9154E−05 | 1.0422E−05 | −1.2324E−05 |
| S6 | 180.0000 | −1.8286E−04 | 1.0169E−04 | −1.8842E−05 | −4.9938E−06 | 2.1064E−07 |
| S7 | −0.3758 | 8.5634E−04 | 2.2076E−04 | 1.3080E−05 | −4.3942E−07 | 5.2981E−07 |
| S8 | −19.7276 | 9.4080E−04 | 8.8925E−04 | −5.1677E−05 | 1.5404E−05 | 6.1186E−06 |
| S13 | −2.5000 | 4.9784E−04 | −2.7127E−04 | 2.9259E−05 | −2.7265E−06 | 3.6509E−08 |

Embodiment 12

Figure 12:
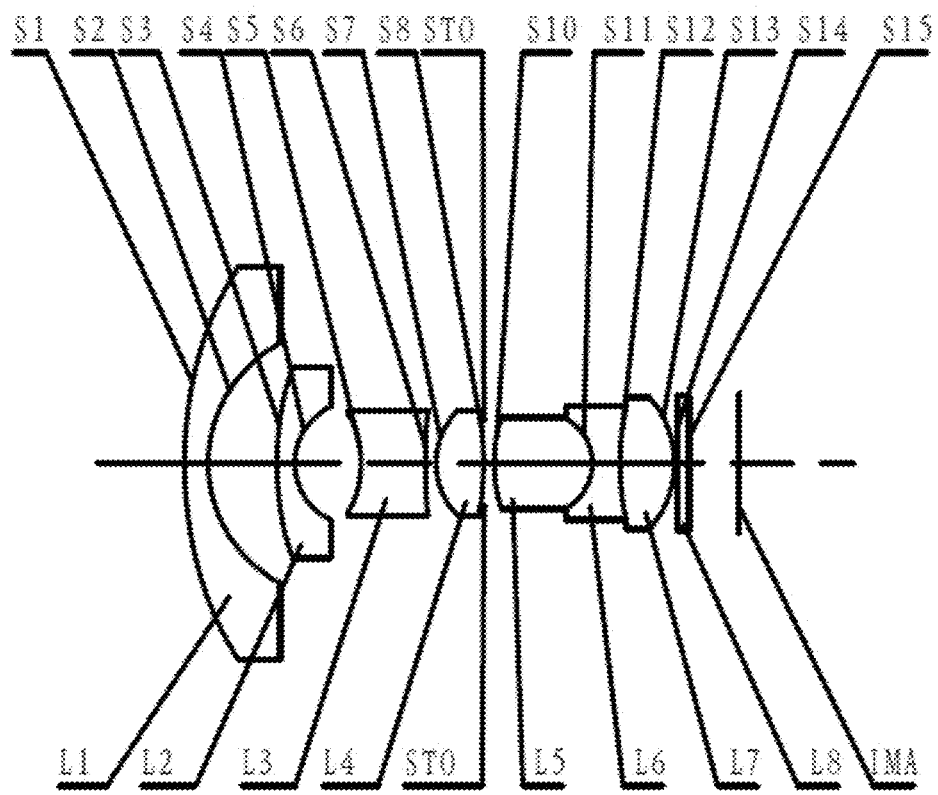
FIG. 12 illustrates a schematic structural diagram of an optical lens assembly according to Embodiment 12 of the present disclosure.

An optical lens assembly according to Embodiment 12 of the present disclosure is described below with reference to FIG. 12. FIG. 12 illustrates a schematic structural diagram of the optical lens assembly according to Embodiment 12 of the present disclosure.

As shown in FIG. 12, the optical lens assembly, from an object side to an image side along an optical axis sequentially includes: a first lens L1, a second lens L2, a third lens L3, a fourth lens L4, a fifth lens L5, a sixth lens L6 and a seventh lens L7.

The first lens L1 is a meniscus lens having negative refractive power, an object-side surface S1 of the first lens is a convex surface, and an image-side surface S2 of the first lens is a concave surface. The second lens L2 is a meniscus lens having negative refractive power, an object-side surface S3 of the second lens is a convex surface, and an image-side surface S4 of the second lens is a concave surface. The third lens L3 is a biconcave lens having negative refractive power, an object-side surface S5 of the third lens is a concave surface, and an image-side surface S6 of the third lens is a concave surface. The fourth lens L4 is a biconvex lens having positive refractive power, an object-side surface S7 of the fourth lens is a convex surface, and an image-side surface S8 of the fourth lens is a convex surface. The fifth lens L5 is a biconvex lens having positive refractive power, an object-side surface S10 of the fifth lens is a convex surface, and an image-side surface S11 of the fifth lens is a convex surface. The sixth lens L6 is a biconcave lens having negative refractive power, an object-side surface S11 of the sixth lens is a concave surface, and an image-side surface S12 of the sixth lens is a concave surface. The seventh lens L7 is a biconvex lens having positive refractive power, an object-side surface S12 of the seventh lens is a convex surface, and an image-side surface S13 of the seventh lens is a convex surface. The fifth lens L5, the sixth lens L6, and the seventh lens L7 may be cemented to form a cemented lens.

The optical lens assembly may further include a stop STO, and the stop STO may be disposed between the fourth lens L4 and the fifth lens L5 to improve imaging quality. For example, the stop STO may be arranged close to the image-side surface S8 of the fourth lens L4.

In this Embodiment, the object-side surfaces and the image-side surfaces of the second lens L2, the third lens L3, and the fourth lens L4 may be aspheric. In addition, the image-side surface S13 of the seventh lens L7 may be aspheric.

Alternatively, the optical lens assembly may further include an optical filter L8 having an object-side surface S14 and an image-side surface S15 and/or a cover lens L8'. The optical filter L8 may be used to correct color deviations. The cover lens L8' may be used to protect an image sensor chip located on an imaging plane IMA. Light from an object sequentially passes through the respective surfaces S1 to S15 and finally images on the imaging plane IMA.

Table 23 shows the radius of curvature R, the thickness T, the refractive index Nd, and the abbe number Vd of each lens of the optical lens assembly of Embodiment 12. Table 24 below shows the conic coefficient K and the high-order coefficients A, B, C, D and E applicable to aspheric surfaces in Embodiment 12 The definition of the surface number in Table 24 is the same as that in Table 23.

TABLE 23

| Surface number | Radius of curvature R (mm) | Thickness T (mm) | Refractive index Nd | Abbe number Vd |
|---|---|---|---|---|
| S1 | 18.3101 | 1.1000 | 1.78 | 49.62 |
| S2 | 6.4538 | 3.1997 | | |
| S3 | 16.0500 | 0.8200 | 1.69 | 54.57 |
| S4 | 3.1583 | 3.0755 | | |
| S5 | −5.0818 | 3.0000 | 1.59 | 61.25 |
| S6 | 16.0200 | 0.4902 | | |
| S7 | 3.5239 | 2.2000 | 1.62 | 63.41 |
| S8 | −7.1700 | 0.0181 | | |
| STO | Infinite | 0.4859 | | |
| S10 | 6.9500 | 4.5500 | 1.49 | 82.59 |
| S11 | −2.4350 | 1.3000 | 1.78 | 25.71 |
| S12 | 12.8694 | 2.5100 | 1.59 | 61.25 |
| S13 | −3.6300 | 0.1481 | | |
| S14 | Infinite | 0.5500 | 1.52 | 64.21 |
| S15 | Infinite | 2.3023 | | |
| IMA | Infinite | | | |

TABLE 24

| Surface number | K | A | B | C | D | E |
|---|---|---|---|---|---|---|
| S3 | −72.0000 | 4.1669E−04 | 5.6015E−05 | −1.4810E−06 | −1.4653E−08 | 7.4635E−10 |
| S4 | 0.3204 | −4.0954E−03 | 3.4552E−04 | −4.3062E−05 | 4.0870E−06 | −1.7391E−07 |
| S5 | −6.0500 | −4.9287E−03 | 2.0491E−04 | −1.0670E−04 | 1.9727E−05 | −2.3167E−06 |
| S6 | −16.3000 | 2.2710E−04 | −2.5417E−04 | −1.6615E−05 | −1.3256E−06 | 1.1557E−07 |
| S7 | −0.6476 | −1.4751E−04 | 2.2485E−04 | 1.9330E−05 | 3.6371E−07 | 3.1612E−07 |

TABLE 24-continued

| Surface number | K | A | B | C | D | E |
|---|---|---|---|---|---|---|
| S8 | −13.0000 | 4.2839E−04 | 9.1767E−04 | −5.4142E−05 | 1.6025E−05 | 5.2265E−07 |
| S13 | −2.2857 | 4.3813E−04 | −2.5647E−04 | 4.2948E−05 | −3.8508E−06 | 1.0082E−07 |

Embodiment 13

Figure 13:
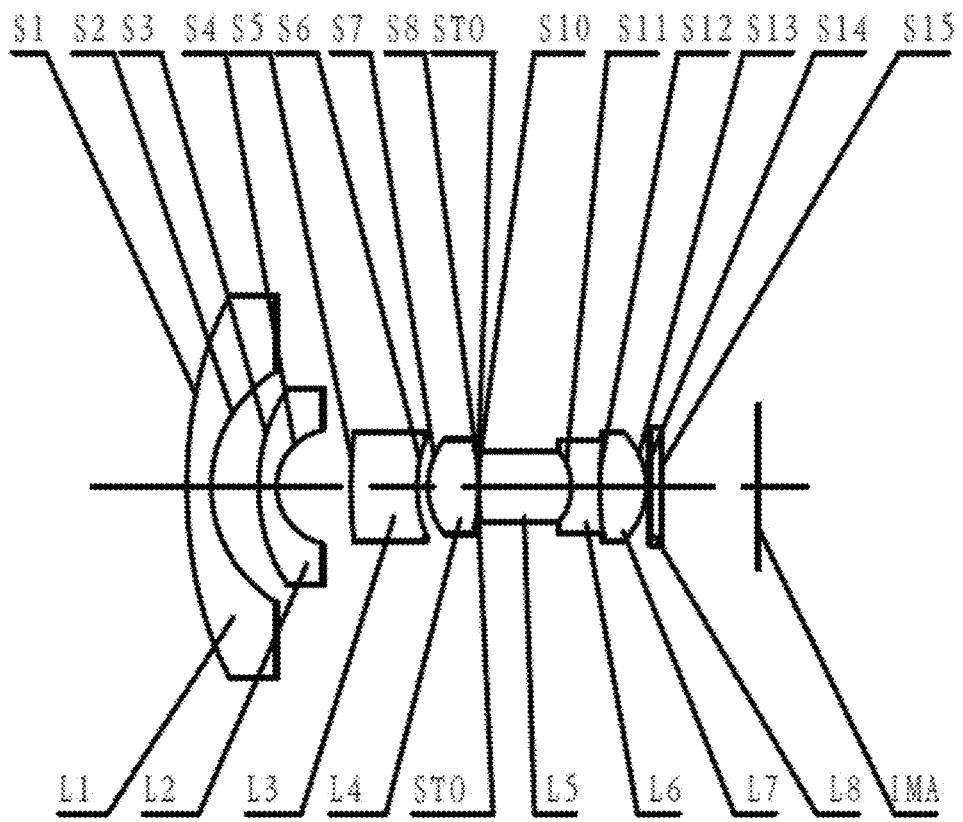
FIG. 13 illustrates a schematic structural diagram of an optical lens assembly according to Embodiment 13 of the present disclosure.

An optical lens assembly according to Embodiment 13 of the present disclosure is described below with reference to FIG. 13. FIG. 13 illustrates a schematic structural diagram of the optical lens assembly according to Embodiment 13 of the present disclosure.

As shown in FIG. 13, the optical lens assembly, from an object side to an image side along an optical axis sequentially includes: a first lens L1, a second lens L2, a third lens L3, a fourth lens L4, a fifth lens L5, a sixth lens L6 and a seventh lens L7.

The first lens L1 is a meniscus lens having negative refractive power, an object-side surface S1 of the first lens is a convex surface, and an image-side surface S2 of the first lens is a concave surface. The second lens L2 is a meniscus lens having negative refractive power, an object-side surface S3 of the second lens is a convex surface, and an image-side surface S4 of the second lens is a concave surface. The third lens L3 is a meniscus lens having negative refractive power, an object-side surface S5 of the third lens is a convex surface, and an image-side surface S6 of the third lens is a concave surface. The fourth lens L4 is a biconvex lens having positive refractive power, an object-side surface S7 of the fourth lens is a convex surface, and an image-side surface S8 of the fourth lens is a convex surface. The fifth lens L5 is a biconvex lens having positive refractive power, an object-side surface S10 of the fifth lens is a convex surface, and an image-side surface S11 of the fifth lens is a convex surface. The sixth lens L6 is a biconcave lens having negative refractive power, an object-side surface S11 of the sixth lens is a concave surface, and an image-side surface S12 of the sixth lens is a concave surface. The seventh lens L7 is a biconvex lens having positive refractive power, an object-side surface S12 of the seventh lens is a convex surface, and an image-side surface S13 of the seventh lens is a convex surface. The fifth lens L5, the sixth lens L6, and the seventh lens L7 may be cemented to form a cemented lens.

The optical lens assembly may further include a stop STO, and the stop STO may be disposed between the fourth lens L4 and the fifth lens L5 to improve imaging quality. For example, the stop STO may be arranged close to the image-side surface S8 of the fourth lens L4.

In this Embodiment, the object-side surfaces and the image-side surfaces of the second lens L2, the third lens L3, and the fourth lens L4 may be aspheric. In addition, the image-side surface S13 of the seventh lens L7 may be aspheric.

Alternatively, the optical lens assembly may further include an optical filter L8 having an object-side surface S14 and an image-side surface S15 and/or a cover lens L8'. The optical filter L8 may be used to correct color deviations. The cover lens L8' may be used to protect an image sensor chip located on an imaging plane IMA. Light from an object sequentially passes through the respective surfaces S1 to S15 and finally images on the imaging plane IMA.

Table 25 shows the radius of curvature R, the thickness T, the refractive index Nd, and the abbe number Vd of each lens of the optical lens assembly of Embodiment 13. Table 26 below shows the conic coefficient K and the high-order coefficients A, B, C, D and E applicable to aspheric surfaces in Embodiment 13. The definition of the surface number in Table 26 is the same as that in Table 25.

TABLE 25

| Surface number | Radius of curvature R (mm) | Thickness T (mm) | Refractive index Nd | Abbe number Vd |
|---|---|---|---|---|
| S1 | 20.3000 | 1.1000 | 1.77 | 49.60 |
| S2 | 6.1300 | 2.1485 | | |
| S3 | 9.9500 | 0.8200 | 1.69 | 54.53 |
| S4 | 2.8722 | 3.3647 | | |
| S5 | 42.0000 | 3.0000 | 1.59 | 61.25 |
| S6 | 4.6997 | 0.4902 | | |
| S7 | 3.5904 | 2.2700 | 1.63 | 63.40 |
| S8 | −7.8781 | 0.0181 | | |
| STO | Infinite | 0.0000 | | |
| S10 | 11.6000 | 4.2000 | 1.50 | 81.60 |
| S11 | −2.5600 | 1.3000 | 1.78 | 25.72 |
| S12 | 17.6000 | 2.1000 | 1.59 | 61.25 |
| S13 | −3.0000 | 0.1481 | | |
| S14 | Infinite | 0.5500 | 1.52 | 64.21 |
| S15 | Infinite | 4.3715 | | |
| IMA | Infinite | | | |

TABLE 26

| Surface number | K | A | B | C | D | E |
|---|---|---|---|---|---|---|
| S3 | 2.8700 | 1.1863E−04 | 1.6462E−05 | −1.3286E−06 | −2.0340E−09 | 5.5693E−11 |
| S4 | 0.2350 | −1.8486E−04 | 4.0684E−04 | −4.9175E−05 | 3.4565E−07 | 1.8011E−08 |
| S5 | 185.0000 | 4.7902E−04 | 6.1296E−05 | 6.1923E−07 | 5.0443E−07 | 2.6290E−07 |
| S6 | −4.5000 | −4.5907E−04 | −1.7882E−04 | −3.5747E−05 | −1.1989E−06 | 1.0623E−06 |
| S7 | −0.5210 | 3.2845E−04 | 3.2133E−04 | 4.6095E−05 | 9.0853E−06 | −4.3862E−07 |
| S8 | −18.5000 | 1.3149E−03 | 1.1787E−03 | 2.6899E−05 | 2.5653E−05 | 1.3610E−06 |
| S13 | −1.8000 | −3.1122E−03 | −2.3755E−04 | 4.7835E−05 | −7.0866E−06 | 3.2655E−07 |

In view of the above, Embodiments 1 to 13 respectively satisfy the relationships shown in Tables 27-a and 27-b below. In Tables 27-a and 27-b, the unit of TL, F, TTL, H, D, d12, F2, F3, F4, F5, R5, F567 is millimeter (mm), and the unit of FOV and arctan(SAG2/d2) is degree(°). Tables 27-a and 27-b below shows a refractive index Nd1 of the material of the first lens L1, a lens group length TL of the optical lens assembly, a total track length TTL of the optical lens assembly, a maximum aperture diameter D of the object-side surface S1 of the first lens L1 corresponding to a maximum field-of-view of the optical lens assembly, an image height H corresponding to the maximum field-of-view of the optical lens assembly, the maximum field-of-view FOV of the optical lens assembly, an axial distance d12 from a center of the image-side surface S2 of the first lens L1 to a center of the object-side surface S3 of the second lens L2, an axial distance d34 from a center of the image-side surface S6 of the third lens L3 to a center of the object-side surface S8 of the fourth lens L4, an axial distance d45 from a center of the image-side surface S9 of the fourth lens L4 to a center of the object-side surface S10 of the fifth lens L5, a total focal length value F of the optical lens assembly, a temperature coefficient of refractive index dn/dt(5) of the fifth lens L5, a temperature coefficient of refractive index dn/dt(6) of the sixth lens L6, a focal length value F2 of the second lens L2, a focal length value F3 of the third lens L3, a focal length value F4 of the fourth lens L4, a focal length value F5 of the fifth lens L5, a focal length value F7 of the seventh lens L7, a combined focal length F567 of the fifth lens, the sixth lens, and the seventh lens, a radius of curvature R5 of the object-side surface of the third lens, and an opening angle arctan(SAG2/d2) of the image-side surface of the first lens under a maximum field-of-view of the optical lens assembly.

TABLE 27-a

| Condition/Embodiment | 1 | 2 | 3 | 4 | 5 | 6 | 7 |
|---|---|---|---|---|---|---|---|
| Nd1 | 1.78 | 1.78 | 1.78 | 1.77 | 1.77 | 1.77 | 1.77 |
| TL | 23.7041 | 23.3073 | 23.0118 | 23.2693 | 23.2672 | 23.2683 | 23.2704 |
| TTL | 26.0832 | 26.2678 | 25.5781 | 25.7745 | 25.3283 | 25.2102 | 25.5014 |
| D | 18.2478 | 18.0000 | 17.3467 | 16.2468 | 15.9159 | 15.5690 | 18.0252 |
| H | 5.2880 | 7.5840 | 7.2460 | 7.6020 | 7.1840 | 7.2580 | 7.3380 |
| FOV | 198 | 198 | 198 | 198 | 198 | 198 | 198 |
| d12 | 3.4087 | 3.1241 | 2.8572 | 3.0000 | 3.0093 | 3.0093 | 3.0093 |
| d34 | 1.9368 | 1.9318 | 1.9318 | 1.9330 | 1.9318 | 1.9318 | 1.9318 |
| d45 | 1.7421 | 1.7421 | 1.7421 | 1.7421 | 1.7421 | 1.7421 | 1.7421 |
| F | 2.0659 | 2.2784 | 2.2804 | 2.3450 | 2.2769 | 2.2485 | 2.2930 |
| dn/dt (5) | −2.0800E−05 | −2.0300E−05 | −1.8300E−05 | −2.0200E−05 | −2.0200E−05 | −2.0200E−05 | −2.0200E−05 |
| dn/dt (6) | 8.8500E−06 | −4.9700E−06 | 3.7000E−06 | −4.9700E−06 | −4.9700E−06 | −4.9700E−06 | −4.9700E−06 |
| F2 | −8.0580 | −8.0842 | −7.8935 | −6.4304 | −8.9247 | −9.0234 | −8.2563 |
| F3 | −12.5455 | −13.1468 | −12.5903 | −15.8724 | −25.8449 | −13.1420 | −8.6419 |
| F4 | 4.9475 | 4.9932 | 4.9548 | 5.1414 | 7.0608 | 5.4167 | 5.5350 |
| F5 | 4.2648 | 4.4226 | 4.2512 | 4.2596 | 4.1163 | 4.1374 | 4.1424 |
| F7 | 6.9475 | 6.9993 | 6.9907 | 7.6888 | 9.3180 | 8.2048 | 8.8560 |
| F567 | 15.1827 | 18.5744 | 16.8307 | 19.5053 | 13.5435 | 16.9090 | 12.7826 |
| R5 | 162.3933 | 94.7339 | 140.3007 | 87.5166 | −4.6888 | −14.4502 | −6.0121 |
| TL/F | 11.474 | 10.230 | 10.091 | 9.923 | 10.219 | 10.348 | 10.149 |
| TTL/H/FOV | 0.025 | 0.017 | 0.018 | 0.017 | 0.018 | 0.018 | 0.018 |
| D/H/FOV | 0.017 | 0.012 | 0.012 | 0.011 | 0.011 | 0.011 | 0.012 |
| (FOV × F)/H | 77.356 | 59.484 | 62.314 | 61.078 | 62.753 | 61.340 | 61.871 |
| d12/TTL | 0.131 | 0.119 | 0.112 | 0.116 | 0.119 | 0.119 | 0.118 |
| d34/d45 | 1.112 | 1.109 | 1.109 | 1.108 | 1.109 | 1.109 | 1.109 |
| |F2/F| | 3.900 | 3.548 | 3.461 | 2.742 | 3.920 | 4.013 | 3.601 |
| F4/F5 | 1.160 | 1.129 | 1.166 | 1.207 | 1.715 | 1.309 | 1.336 |
| F7/F | 3.363 | 3.072 | 3.065 | 3.279 | 4.092 | 3.649 | 3.862 |
| |F3/R5| | 0.077 | 0.139 | 0.090 | 0.181 | 5.512 | 0.909 | 1.437 |
| F567/F | 7.349 | 8.152 | 7.380 | 8.318 | 5.948 | 7.520 | 5.575 |
| dn/dt (5) +dn/dt (6) | −1.195E−05 | −2.527E−05 | −1.460E−05 | −2.517E−05 | −2.517E−05 | −2.517E−05 | −2.517E−05 |
| arctan (SAG2/d2) | 72.792 | 72.475 | 66.881 | 60.124 | 59.830 | 59.064 | 57.379 |

TABLE 27-b

| Condition/Embodiment | 8 | 9 | 10 | 11 | 12 | 13 |
|---|---|---|---|---|---|---|
| Nd1 | 1.75 | 1.76 | 1.76 | 1.77 | 1.78 | 1.77 |
| TL | 23.4514 | 22.8129 | 22.9272 | 21.8717 | 22.7494 | 20.8115 |
| TTL | 26.4521 | 25.5772 | 25.3554 | 25.4442 | 25.7499 | 25.8811 |
| D | 18.9882 | 18.1517 | 18.0339 | 17.3281 | 18.5372 | 17.3394 |
| H | 7.7000 | 7.8080 | 7.2000 | 7.5160 | 7.2080 | 7.4600 |
| FOV | 198 | 198 | 198 | 198 | 198 | 198 |
| d12 | 3.9210 | 3.1997 | 2.2482 | 3.1283 | 3.1997 | 2.1485 |
| d34 | 0.4902 | 0.4902 | 0.5202 | 0.4902 | 0.4902 | 0.4902 |
| d45 | 0.4713 | 0.4775 | 0.3800 | 0.0375 | 0.5040 | 0.0181 |
| F | 1.9638 | 2.0016 | 2.2700 | 2.1148 | 2.1891 | 2.2829 |
| dn/dt (5) | −2.0200E−05 | −2.0200E−05 | −2.0200E−05 | −2.0200E−05 | −2.0200E−05 | −2.0200E−05 |
| dn/dt (6) | −4.9700E−06 | −4.9700E−06 | −4.9700E−06 | −4.9700E−06 | −4.9700E−06 | −4.9700E−06 |
| F2 | −5.8014 | −5.7686 | −6.2031 | −4.9408 | −5.8068 | −6.0791 |
| F3 | −8.8235 | −8.8383 | −9.3861 | −10.4737 | −6.1773 | −9.1991 |

TABLE 27-b-continued

| Condition/Embodiment | 8 | 9 | 10 | 11 | 12 | 13 |
|---|---|---|---|---|---|---|
| F4 | 4.3766 | 4.3611 | 4.6176 | 4.4895 | 4.1109 | 4.2449 |
| F5 | 4.5015 | 4.2555 | 4.6072 | 4.0476 | 4.3588 | 4.6585 |
| F7 | 4.3218 | 4.3977 | 5.1436 | 5.4471 | 5.0529 | 4.4705 |
| F567 | 7.5703 | 7.9344 | 9.9069 | 11.9975 | 9.7094 | 7.5965 |
| R5 | −4.6510 | −4.6535 | −4.9308 | −5.6207 | −5.0818 | 42.0000 |
| TL/F | 11.942 | 11.397 | 10.100 | 10.342 | 10.392 | 9.116 |
| TTL/H/FOV | 0.017 | 0.017 | 0.018 | 0.017 | 0.018 | 0.018 |
| D/H/FOV | 0.012 | 0.012 | 0.013 | 0.012 | 0.013 | 0.012 |
| (FOV × F)/H | 50.498 | 50.758 | 62.425 | 55.711 | 60.132 | 60.593 |
| d12/TTL | 0.148 | 0.125 | 0.089 | 0.123 | 0.124 | 0.083 |
| d34/d45 | 1.040 | 1.027 | 1.369 | 13.058 | 0.973 | 27.090 |
| |F2/F| | 2.954 | 2.882 | 2.733 | 2.336 | 2.653 | 2.663 |
| F4/F5 | 0.972 | 1.025 | 1.002 | 1.109 | 0.943 | 0.911 |
| F7/F | 2.201 | 2.197 | 2.266 | 2.576 | 2.308 | 1.958 |
| |F3/R5| | 1.897 | 1.899 | 1.904 | 1.863 | 1.216 | 0.219 |
| F567/F | 3.855 | 3.964 | 4.364 | 5.673 | 4.435 | 3.327 |
| dn/dt (5) +dn/dt (6) | −2.517E−05 | −2.517E−05 | −2.517E−05 | −2.517E−05 | −2.517E−05 | −2.517E−05 |
| arctan(SAG2/d2) | 70.887 | 66.035 | 57.481 | 61.727 | 61.140 | 58.927 |

The present disclosure further provides an imaging device, which may include the optical lens assembly according to the above-mentioned embodiments of the present disclosure and an imaging element for converting an optical image formed by the optical lens assembly into an electrical signal. The imaging element may be a photosensitive Charge-Coupled Device (CCD) or a Complementary Metal-Oxide Semiconductor (CMOS). The imaging device may be an independent imaging device such as a detection range camera, or an imaging module integrated on the detection range device. In addition, the imaging device may also be an independent imaging device such as an on-board camera, or an imaging module integrated on, for example, a driving assistance system. The imaging device is equipped with the above-described optical lens assembly.

The foregoing is only a description of the preferred Embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical lens assembly, from an object side to an image side along an optical axis sequentially comprising: a first lens, a second lens, a third lens, a fourth lens, a fifth lens, a sixth lens and a seventh lens, wherein,
    the first lens has negative optical power, an object-side surface of the first lens is a convex surface, and an image-side surface of the first lens is a concave surface;
    the second lens has negative optical power, and an image-side surface of the second lens is a concave surface;
    the third lens has negative optical power;
    the fourth lens has positive optical power, and an object-side surface of the fourth lens is a convex surface;
    the fifth lens has positive optical power, and an object-side surface and an image-side surface of the fifth lens are both convex surfaces;
    the sixth lens has negative optical power, and an object-side surface and an image-side surface of the sixth lens are both concave surfaces; and
    the seventh lens has positive optical power, and an object-side surface of the seventh lens is a convex surface,
    wherein a total track length TTL of the optical lens assembly, a maximum field-of-view FOV of the optical lens assembly, and an image height H corresponding to the maximum field-of-view of the optical lens assembly satisfy: TTL/H/FOV≤0.018/degree;
    an effective focal length F3 of the third lens and a radius of curvature R5 of an object-side surface of the third lens may satisfy: |F3/R5|≤1.904; and
    a focal length value F2 of the second lens and a total focal length value F of the optical lens assembly satisfy: 1.5≤|F2/F|≤3.601.

2. The optical lens assembly according to claim 1, wherein
    the fifth lens and the sixth lens are cemented to form a cemented lens; or
    the fifth lens, the sixth lens and the seventh lens are cemented to form a cemented lens.

3. The optical lens assembly according to claim 1, wherein
    a lens group length TL of the optical lens assembly and the total focal length value F of the optical lens assembly satisfy: TL/F≤15; or
    the lens group length TL of the optical lens assembly and the total focal length value F of the optical lens assembly satisfy: 9.116≤TL/F≤14; or
    the lens group length TL of the optical lens assembly and the total focal length value F of the optical lens assembly satisfy: 9.116≤TL/F≤11.942.

4. The optical lens assembly according to claim 1, wherein
    a focal length value F4 of the fourth lens and a focal length value F5 of the fifth lens satisfy: F4/F5≤3; or
    the focal length value F4 of the fourth lens and the focal length value F5 of the fifth lens satisfy: 0.911≤F4/F5≤2.7.

5. The optical lens assembly according to claim 1, wherein the maximum field-of-view FOV of the optical lens assembly, a maximum aperture diameter D of the object-side surface of the first lens corresponding to the maximum field-of-view of the optical lens assembly, and the image height H corresponding to the maximum field-of-view of the optical lens assembly satisfy: D/H/FOV≤0.025/degree, or 0.011/degree≤D/H/FOV≤0.02/degree.

6. The optical lens assembly according to claim 1, wherein
the maximum field-of-view FOV of the optical lens assembly, a total focal length value F of the optical lens assembly, and the image height H corresponding to the maximum field-of-view of the optical lens assembly satisfy: 45°≤(FOV×F)/H; or
the maximum field-of-view FOV of the optical lens assembly, the total focal length value F of the optical lens assembly, and the image height H corresponding to the maximum field-of-view of the optical lens assembly satisfy: 47°≤(FOV×F)/H≤77.356°.

7. The optical lens assembly according to claim 1, wherein
an axial distance d12 from a center of the image-side surface of the first lens to a center of the object-side surface of the second lens and the total track length TTL of the optical lens assembly satisfy: d12/TTL≤0.3, or 0.083≤d12/TTL≤0.2.

8. The optical lens assembly according to claim 1, wherein an opening angle of the image-side surface of the first lens under a maximum field-of-view of the optical lens assembly satisfies: 45°≤arctan (SAG2/d2), or 50°≤arctan (SAG2/d2)≤72.792°,
wherein, d2 is a half-diameter of a maximum aperture diameter of the image-side surface of the first lens corresponding to a maximum field-of-view of the optical lens assembly, and SAG2 is a sagittal height SG value of the image-side surface of the first lens corresponding to the maximum field-of-view of the optical lens assembly.

9. The optical lens assembly according to claim 1, wherein
a focal length value F7 of the seventh lens and a total focal length value F of the optical lens assembly satisfy: F7/F≤5, or 1.958≤F7/F≤4.6.

10. An optical lens assembly, from an object side to an image side along an optical axis sequentially comprising: a first lens, a second lens, a third lens, a fourth lens, a fifth lens, a sixth lens and a seventh lens, wherein
the first lens has negative optical power, an object-side surface of the first lens is a convex surface, and an image-side surface of the first lens is a concave surface;
the second lens has negative optical power;
the third lens has negative optical power;
the fourth lens has positive optical power;
the fifth lens has positive optical power;
the sixth lens has negative optical power;
the seventh lens has positive optical power, and
an opening angle of the image-side surface of the first lens under a maximum field-of-view of the optical lens assembly satisfies: 45°≤arctan (SAG2/d2),
wherein, d2 is a half-diameter of a maximum aperture diameter of the image-side surface of the first lens corresponding to a maximum field-of-view of the optical lens assembly, and SAG2 is a sagittal height SG value of the image-side surface of the first lens corresponding to the maximum field-of-view of the optical lens assembly,
wherein a total track length TTL of the optical lens assembly, a maximum field-of-view FOV of the optical lens assembly, and an image height H corresponding to the maximum field-of-view of the optical lens assembly satisfy: TTL/H/FOV≤0.018/degree,
wherein an effective focal length F3 of the third lens and a radius of curvature R5 of an object-side surface of the third lens may satisfy: |F3/R5|≤1.904; and
a focal length value F2 of the second lens and a total focal length value F of the optical lens assembly satisfy: 1.5≤|F2/F|≤3.601.

11. The optical lens assembly according to claim 10, wherein
the fifth lens and the sixth lens are cemented to form a cemented lens; or
the fifth lens, the sixth lens and the seventh lens are cemented to form a cemented lens.

12. The optical lens assembly according to claim 10, wherein
a lens group length TL of the optical lens assembly and the total focal length value F of the optical lens assembly satisfy: TL/F≤15; or
the lens group length TL of the optical lens assembly and the total focal length value F of the optical lens assembly satisfy: 9.116≤TL/F≤14; or
the lens group length TL of the optical lens assembly and the total focal length value F of the optical lens assembly satisfy: 9.116≤TL/F≤11.942.

13. The optical lens assembly according to claim 10, wherein
a focal length value F4 of the fourth lens and a focal length value F5 of the fifth lens satisfy: F4/F5≤3; or
the focal length value F4 of the fourth lens and the focal length value F5 of the fifth lens satisfy: 0.911≤F4/F5≤2.7.

14. The optical lens assembly according to claim 10, wherein the maximum field-of-view FOV of the optical lens assembly, a maximum aperture diameter D of the object-side surface of the first lens corresponding to the maximum field-of-view of the optical lens assembly, and the image height H corresponding to the maximum field-of-view of the optical lens assembly satisfy: D/H/FOV≤0.025/degree, or 0.011/degree≤D/H/FOV≤0.02/degree.

15. The optical lens assembly according to claim 10, wherein
the maximum field-of-view FOV of the optical lens assembly, a total focal length value F of the optical lens assembly, and the image height H corresponding to the maximum field-of-view of the optical lens assembly satisfy: 45°≤(FOV×F)/H; or
the maximum field-of-view FOV of the optical lens assembly, the total focal length value F of the optical lens assembly, and the image height H corresponding to the maximum field-of-view of the optical lens assembly satisfy: 47°≤(FOV×F)/H≤77.356°.

16. The optical lens assembly according to claim 10, wherein
an axial distance d12 from a center of the image-side surface of the first lens to a center of the object-side surface of the second lens and the total track length TTL of the optical lens assembly satisfy: d12/TTL≤0.3, or 0.083≤d12/TTL≤0.2.

17. The optical lens assembly according to claim 10, wherein
a focal length value F7 of the seventh lens and a total focal length value F of the optical lens assembly satisfy: F7/F≤5, or 1.958≤F7/F≤4.6.

18. An imaging device, comprising the optical lens assembly of claim 1 and an imaging element for converting an optical image formed by the optical lens assembly into an electrical signal.

19. The optical lens assembly according to claim 1, wherein an axial distance d34 from a center of an image-side surface of the third lens to a center of the object-side surface of the fourth lens and an axial distance d45 from a center of an image-side surface of the fourth lens to a center of the object-side surface of the fifth lens may satisfy: 0.973≤d34/d45≤1.6.

20. The optical lens assembly according to claim 10, wherein an axial distance d34 from a center of an image-side surface of the third lens to a center of the object-side surface of the fourth lens and an axial distance d45 from a center of an image-side surface of the fourth lens to a center of the object-side surface of the fifth lens may satisfy: 0.973≤d34/d45≤1.6.

\* \* \* \* \*